(12) United States Patent
Ashirov et al.

(10) Patent No.: US 12,734,487 B2
(45) Date of Patent: Sep. 15, 2026

(54) MEMBRANE ASSEMBLY FOR GAS SEPARATION, METHOD FOR PRODUCING THE MEMBRANE ASSEMBLY AND METHOD OF SEPARATING GASES

(71) Applicant: UNIVERSITE DE FRIBOURG, Fribourg (CH)

(72) Inventors: Timur Ashirov, Fribourg (CH); Ali Coskun, Villars-sur-Glane (CH)

(73) Assignee: Université de Fribourg, Fribourg (CH)

( * ) Notice: Subject to any disclaimer, the term of this patent is extended or adjusted under 35 U.S.C. 154(b) by 356 days.

(21) Appl. No.: 18/265,271

(22) PCT Filed: Dec. 21, 2021

(86) PCT No.: PCT/EP2021/087114
§ 371 (c)(1),
(2) Date: Jun. 5, 2023

(87) PCT Pub. No.: WO2022/136447
PCT Pub. Date: Jun. 30, 2022

(65) Prior Publication Data

US 2024/0109019 A1 Apr. 4, 2024

(30) Foreign Application Priority Data

Dec. 22, 2020 (EP) .................................... 20216718

(51) Int. Cl.
*B01D 53/22* (2006.01)
*B01D 53/04* (2006.01)
(Continued)

(52) U.S. Cl.
CPC ..... *B01D 69/1216* (2022.08); *B01D 53/0407* (2013.01); *B01D 53/0454* (2013.01);
(Continued)

(58) Field of Classification Search
CPC ........... B01D 69/1216; B01D 71/0211; B01D 71/02231; B01D 71/02232;
(Continued)

(56) References Cited

U.S. PATENT DOCUMENTS 10,823,630 B1 * 11/2020 Dong .................... G01L 9/0047
11,559,772 B2 * 1/2023 Agrawal ................ B01D 69/02
(Continued)

OTHER PUBLICATIONS

Kunhiraman, A.K., "Hydrogen evolution reaction catalyzed by platinum nanoislands decorated on three-dimensional nanocarbon hybrid" Ionics (2019) 25:3787-3797.
(Continued)

*Primary Examiner* — Anthony Shumate
(74) *Attorney, Agent, or Firm* — Robert C. Netter, Jr.; Dann, Dorfman, Herrell & Skillman

(57) ABSTRACT

The present invention concerns gas-separation membranes. In some embodiments, the membranes comprise nano- or microislands or non-continuous metal layers suitable to adsorb, react with and/or otherwise retain at least one of the gases to be separated from a mixture of gases. In one embodiment, the membrane comprises a porous graphene membrane on which Pt or Pd nanoislands are deposited using a mesh, while the nanoislands are suitable to retain and bind to $H_2$ while letting helium pass in a $H_2$/He gas mixture. In another embodiment $CO_2$ is separated from a $H_2$/$CO_2$ mixture. The membranes exhibit both, high selectivity and permeance and can be operated at room temperature.

22 Claims, 11 Drawing Sheets

(51) Int. Cl.
*B01D 67/00* (2006.01)
*B01D 69/12* (2006.01)
*B01D 71/02* (2006.01)

(52) U.S. Cl.
CPC ....... *B01D 53/229* (2013.01); *B01D 67/0083* (2013.01); *B01D 71/0211* (2022.08); *B01D 71/0223* (2022.08); *B01D 71/02231* (2022.08); *B01D 71/02232* (2022.08); *B01D 67/0037* (2013.01); *B01D 2325/0283* (2022.08)

(58) Field of Classification Search
CPC ............ B01D 71/0223; B01D 53/0407; B01D 53/0454; B01D 53/229; B01D 67/0083; B01D 2325/0283; B01D 67/0037
See application file for complete search history.

(56) References Cited

U.S. PATENT DOCUMENTS

| | | | | |
|---|---|---|---|---|
| 2005/0115889 | A1* | 6/2005 | Schaevitz | C01B 3/503 210/500.25 |
| 2007/0272079 | A1* | 11/2007 | Malsam | B01D 71/44 96/7 |
| 2009/0291270 | A1* | 11/2009 | Zettl | H01J 37/20 427/596 |
| 2013/0192461 | A1 | 8/2013 | Miller et al. | |
| 2014/0151288 | A1* | 6/2014 | Miller | B32B 5/024 210/500.39 |
| 2015/0214305 | A1* | 7/2015 | Jeon | H10D 62/882 438/669 |
| 2018/0163299 | A1* | 6/2018 | Zhou | C23C 16/26 |
| 2019/0195809 | A1* | 6/2019 | Agarwal | G01N 21/8806 |
| 2019/0312112 | A1* | 10/2019 | Smith | B01D 69/02 |
| 2020/0157674 | A1* | 5/2020 | El Mel | H10F 71/138 |
| 2021/0023508 | A1* | 1/2021 | Agrawal | B01D 67/0093 |
| 2021/0336480 | A1* | 10/2021 | Thibado | H02J 7/345 |
| 2023/0135721 | A1* | 5/2023 | Ding | F25J 3/061 95/50 |

OTHER PUBLICATIONS

Jagtoyen, et al. "Porosity of Carbon Nanotubes" Adsorption Science and Technology (2000) pp. 908-911.

Yun, et al., "Correlations in palladium membranes for hydrogen separation: A review" Journal of Membrane Science (2011) 375(1-2):28-45.

Ashirov, et al., "Ultrahigh permeance metal coated porous graphene membranes with tunable gas selectivities" Chem (2021) 7(9):P2385-2394.

* cited by examiner

Figure 7 (A, B)

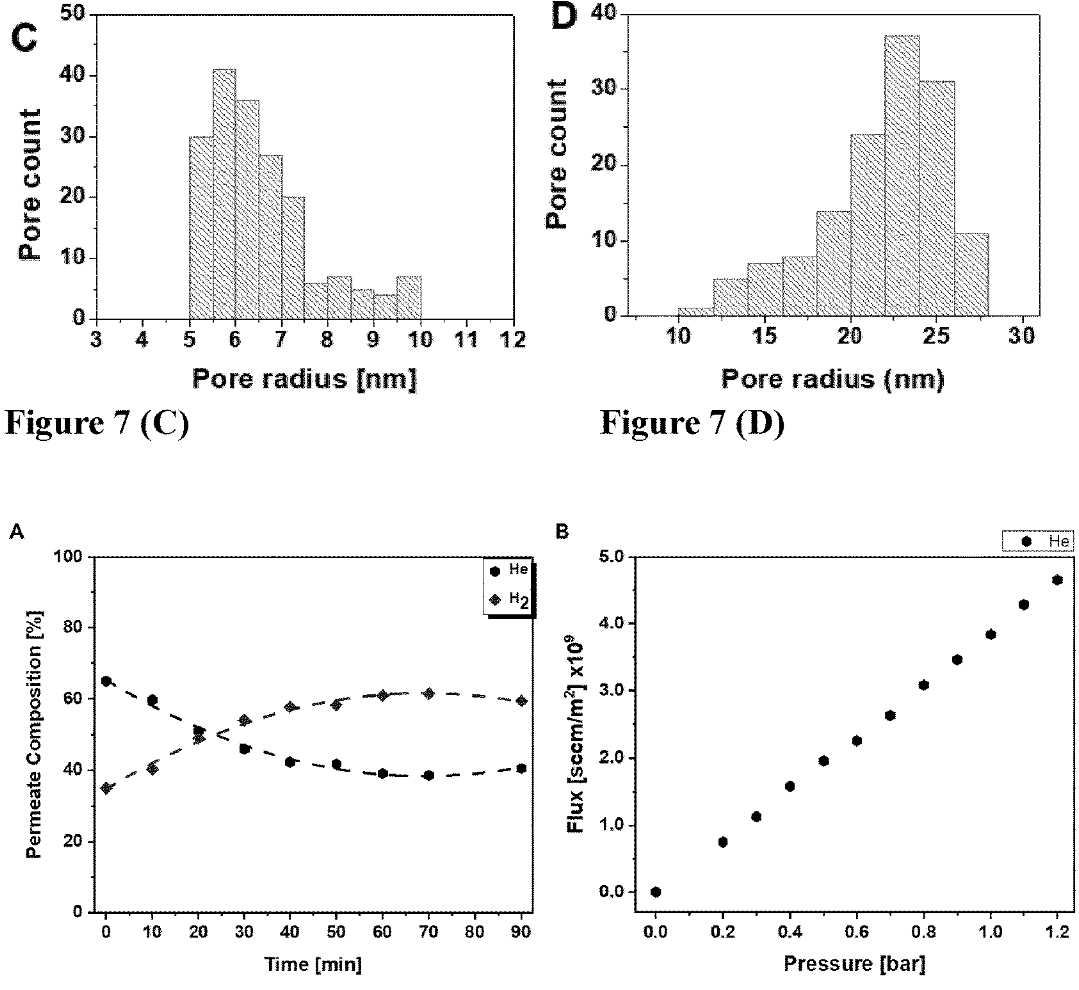
Figure 7 (C)
Figure 7 (D)
Figure 10
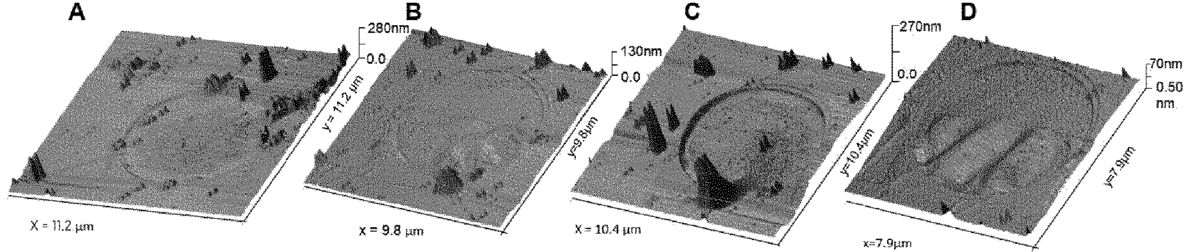
Figure 11

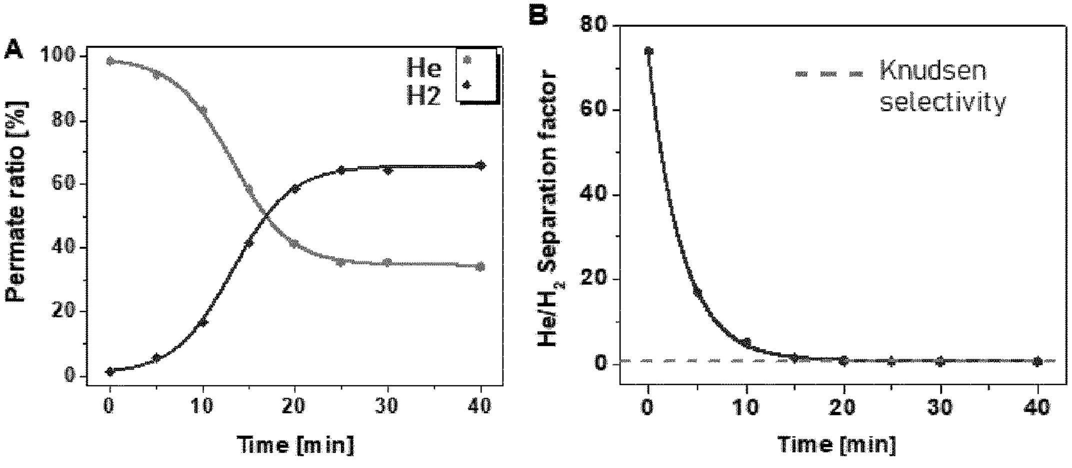
Figure 12 (A, B)
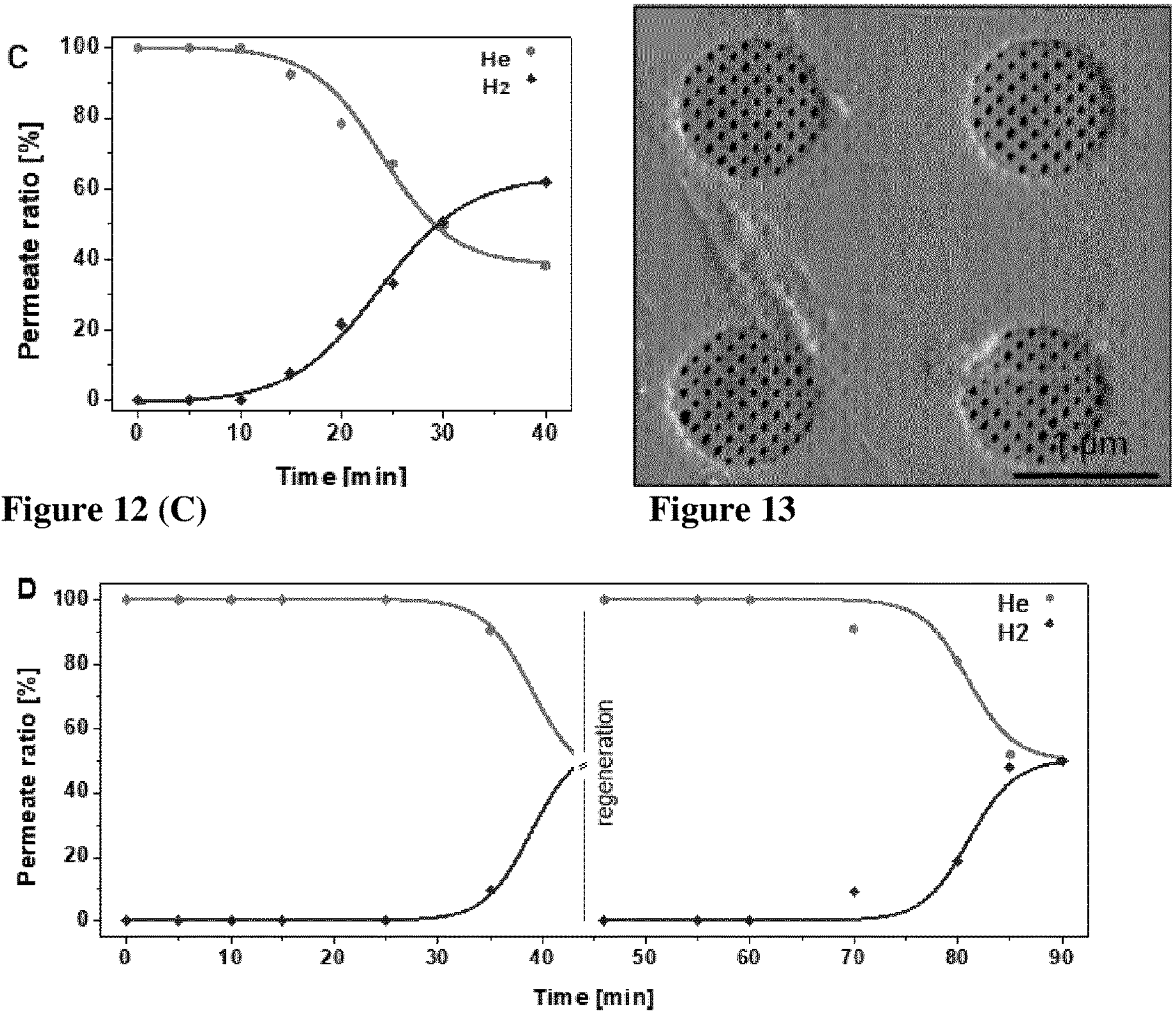
Figure 12 (C)
Figure 13
Figure 12 (D)

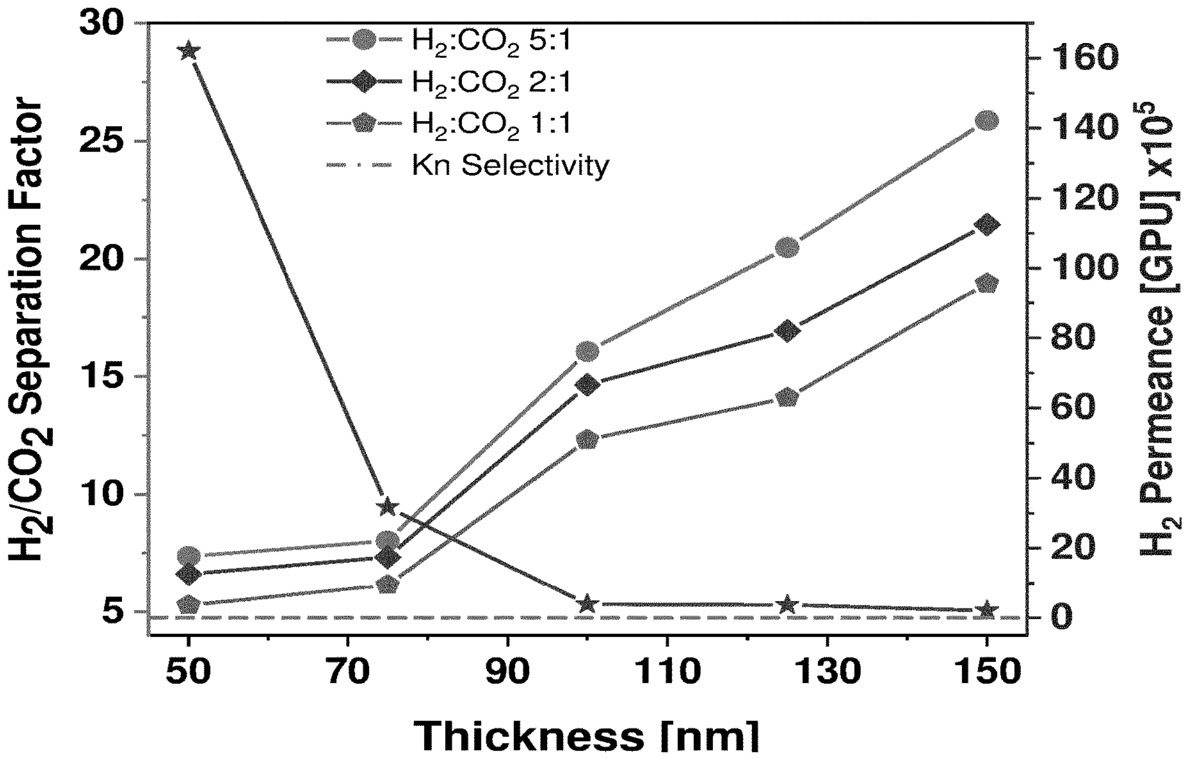
Figure 18
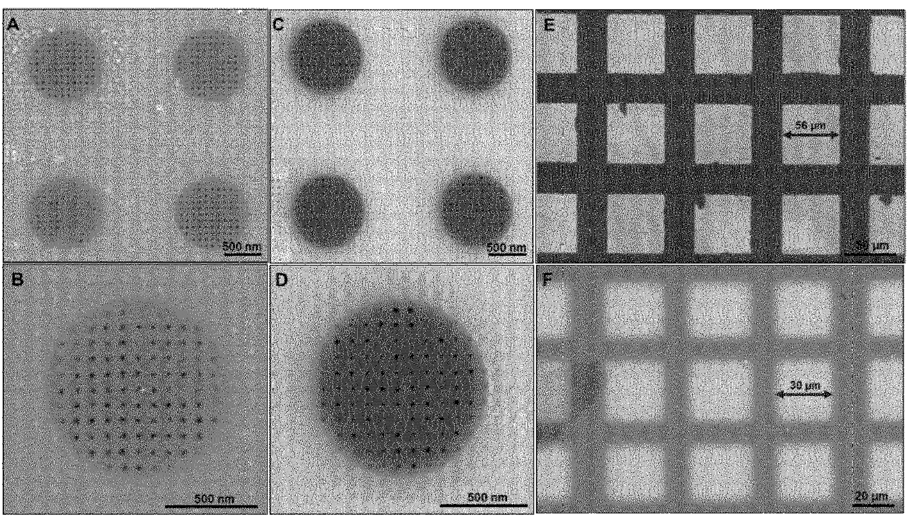
Figure 19 (A-F)

MEMBRANE ASSEMBLY FOR GAS SEPARATION, METHOD FOR PRODUCING THE MEMBRANE ASSEMBLY AND METHOD OF SEPARATING GASES

The present application is § 371 application of PCT/EP2021/087114, filed Dec. 21, 2021, which claims priority to EP Application Serial No. 20216718.5, filed Dec. 22, 2020. The entire disclosure of each of the foregoing applications is incorporated by reference herein.

TECHNICAL FIELD

The present invention relates to a membrane assembly, to a method for producing a membrane assembly, to a method for depositing a graphene membrane on a porous substrate, the use of the membrane assembly for gas separation, and to a method of treating the membrane assembly.

Background Art and Problems Solved by the Invention

Separation processes are of great economic importance considering the fact that they account for 40-90% of capital costs in the industry (L. Giorno, E. Drioli, H. Strathmann, in *Encyclopedia of Membranes*, E. Drioli, L. Giorno, Eds. (Springer Berlin Heidelberg, Berlin, Heidelberg, 2015), pp. 1-6). In this context, membranes play a pivotal role in gas separation, water purification, solvent treatment, and biomedical applications due to their high-energy efficiency, low-cost, robustness, reliability, and scalability (P. Bernardo, E. Drioli, G. Golemme, Membrane Gas Separation: A Review/State of the Art. *Ind. Eng. Chem. Res.* 48, 4638-4663, 2009). In particular, membranes have been widely adopted in gas separation applications as an energy-efficient alternative to cryogenic distillation, separation with solvents and swing adsorption techniques (B. D. Freeman, I. Pinnau, in *Advanced Materials for Membrane Separations*. (American Chemical Society, 2004), vol. 876, chap. 1, pp. 1-23). Membrane gas separation is a pressure-driven process with various industrial applications including air separation, $CO_2$ separation, natural gas purification and many others. All gas separation membranes, however, exhibit a trade-off between permeability, i.e., how fast gas molecules pass through the membrane, and selectivity, i.e., to what extend the target gas molecule can be separated from the mixture (L. M. Robeson, The upper bound revisited. *J. Membrane Sci.* 320, 390-400 (2008). The commercially desirable membrane is the one that has both high selectivity and high permeance as it will significantly reduce the membrane footprint as well as the capital and energy needs.

There are three main mechanisms of gas separation using conventional membranes, these are; Knudsen diffusion, molecular sieving and solution-diffusion mechanisms (FIG. 2, panel A). Knudsen diffusion occurs when the pore size is equal or smaller than the mean free path of the gas and the separation occurs due to the mass difference of permeating gases (L. Giorno et al, 2015). Although the permeation flux is high, the selectivity is limited to the square root of the mass ratios of components according to Graham's law. Molecular sieving happens when the membrane pores are small and allow only a single gas to pass through, thus leading to a high selectivity, but a very low permeance due to the small pore size. Solution-diffusion mechanism is based on the diffusivity and solubility of the gases in the membrane. The permeance of more soluble component is higher and it flows faster through the membrane leading to high selectivity, but low permeance due to slow diffusion rates. The current state-of-the-art gas separation membranes based on aforementioned mechanisms need to be tailored in an advanced way to separate a particular gas mixture and are subject to a trade-off between permeability and selectivity. In order to simultaneously achieve high selectivity and permeance, membrane materials that do not obey a simple trade-off rule would be required. In this direction, catalytic gas separation membranes based on Pd with infinite hydrogen selectivity are currently studied for hydrogen separation and purification (S. Yun, S. T. Oyama, Correlations in palladium membranes for hydrogen separation: A review. *J Membrane Sci* 375, 28-45, 2011). However, these membranes are of high-cost as they require a defect-free, tens of microns thick layer of precious metal, Pd and/or its alloys with Au, Ag, Cu. Moreover, high operating temperatures of these membranes, above 400° C., not only make them energy-inefficient, but also cause crack and defect formation as well as corrosion, thus leading to inferior gas separation performance.

Samhun Yun et al., J Membrane Sci 375 (2011) 28-45 is a review article concerned specifically with membranes for hydrogen separation by diffusion of hydrogen through a palladium film. This document is thus concerned with gas separation by solution-diffusion.

US 2013/0192461 A1 discloses gas separation by solution-diffusion by way of graphene monolayers in contact with a substrate and a gas sorbent material which may be a metal layer such as a palladium layer. This document also teaches a membrane that selectively facilitates passage of a smaller gas on the bases of the diameter of the pores in the membrane.

It is an objective of the invention to provide a membrane suitable in the separation of gases, preferably a membrane that does not obey the trade-off rule between selectivity and permeability, and which has thus high selectivity and permeance.

It is an objective of the invention to provide a gas-separation membrane that can be produced cost-effectively, for example at a lower cost than membranes comprising layers of precious metals.

It is an objective of the invention to provide a gas-separation membrane that can be used also at or around room temperature (RT: 25° C.), knowing that current membranes based on solution-diffusion need to be heated to around 400° C. in order to effective (see Pd containing membranes mentioned above).

It is an objective of the invention to provide a gas-separation membrane that can be regenerated and thus be used several times.

It is an objective of the invention so separate $H_2$ from gas mixtures comprising $H_2$ and other gases, for example helium. He separation is economically very important considering that helium demand has increased over 1 billion cubic feet since the last decade and its price has exceeded $100 per cubic feet. Processes where helium is involved as a cooling medium, superconducting magnets and inert atmosphere require extensive He/$H_2$ separation and He recovery. For example, NASA uses one million cubic feet of He for each rocket launch.

It is another objective to separate $CO_2$ from gas mixtures comprising $CO_2$ and other gases, such as $H_2$, for example.

SUMMARY OF THE INVENTION

The inventors surprisingly provide a membrane assembly, which is useful in gas separation. The membranes are preferably provided to adsorb, absorb and/or dissolve a gas to be separated from a mixture of gases. Preferably, the membrane assembly is adsorptive with respect to at least one gas of the mixture of gases.

In an aspect, the invention provides a membrane assembly comprising a porous membrane layer and, on said porous membrane layer, a gas-affinity material, wherein said gas-affinity material is non-continuously deposited and/or is of irregular thickness, and wherein said gas-affinity material is suitable to adsorb, absorb and/or dissolve a gas to be separated from a mixture of gases.

In an aspect, the invention provides a membrane assembly comprising a porous membrane and a gas-affinity material deposited on the porous membrane, wherein said gas-affinity material is non-continuously deposited, and wherein said gas-affinity material is suitable to adsorb, absorb and/or dissolve a gas to be separated from a mixture of gases.

In an aspect, the invention provides a membrane assembly comprising a porous membrane layer and a gas-affinity material, wherein said gas-affinity material comprises separated raised areas on said porous membrane, and wherein said gas-affinity material is suitable to adsorb, absorb and/or dissolve a gas to be separated from a mixture of gases.

In an aspect, the invention provides a method for producing a membrane assembly, comprising:

- providing an assembly comprising a membrane layer on a porous substrate;
- if necessary; providing pores in said membrane, thereby obtaining a porous membrane layer; and,
- depositing said gas-affinity material on said porous membrane layer, wherein said gas-affinity material is non-continuously deposited and/or is of irregular thickness.

In an aspect, the invention provides a method for producing a membrane assembly comprising a membrane deposited on a substrate of choice, the method comprising:

- providing a first subassembly comprising a membrane deposited on a first side of a provisional membrane substrate;
- depositing a transfer material on said membrane;
- removing said provisional membrane substrate and, if present, an optionally present membrane provided on a second side of said provisional membrane substrate, thereby obtaining a second subassembly comprising said transfer material and said membrane;
- placing said second subassembly on said substrate of choice, so as to obtain a third subassembly comprising said substrate of choice and said second subassembly (22);
- dissolving the transfer material of the third subassembly and thereby obtaining said membrane assembly.

In a preferred embodiment, said transfer material is a photoresist material.

In an aspect, the invention provides the use of the membrane assembly of the invention as a gas-separation membrane and/or for the separation of gases.

In an aspect, the invention provides a method for separating one or more gases from a mixture of gases, the method comprising:

- exposing the mixture of gases to a first side of the membrane assembly of the invention;
- collecting and/or obtaining one or more gases that are separated from the mixture of gases on a second side of the membrane assembly.

In an aspect, the invention provides a method for restoring at least partially an initial separation capacity of a membrane and/or membrane assembly that has been used for the separation of gases, the method comprising:

- exposing the membrane to a temperature above 100° C., preferably 200° C. or higher, not more than 500° C., preferably between 100-300° C.

In an aspect, the invention provides a method for treating a membrane assembly in order to restore at least partially an initial separation capacity of the membrane assembly, the method comprising:

- exposing the membrane to a temperature above 100° C., preferably 200° C. or higher, not more than 500° C., preferably between 100-300° C.

In an aspect, the invention provides a membrane for adsorptive separation of gases, a method for separating gases by adsorptive separation, and to the use of the membranes disclosed herein for adsorptive separation.

Further aspects and preferred embodiments of the invention are defined herein below and in the appended claims. Further features and advantages of the invention will become apparent to the skilled person from the description of the preferred embodiments given below.

BRIEF DESCRIPTION OF THE DRAWINGS

FIG. 7 SEM images of four $SiN_x$ pores covered with double layer graphene after FIB pore fabrication using 0.5 ms (PG-1) (A) and 9.0 ms (PG-2) (B) of dwell time and single pass, (C-D) Pore size distribution histograms of SEM image in A (C) and in B (D) calculated using ImageJ software, median in A=6.5 nm, median in B=22.0 nm. Note: SEM images were digitally enhanced in order to better visualize the graphene holes.

FIG. 10(A) Dependence of permeate ratio (%) vs time for $He/H_2$ separation with G/Pt-FIB membrane, as shown in the graph, membrane becomes saturated at t=21 min and after this point, it starts to favor the $H_2$ instead of He. (B) He flux vs pressure curve of G/Pt-FIB membrane. G/Pt-FIB membrane was prepared using 100 μs dwell time and single pass at 5.0 kV accelerating voltage and 0.80 nA current.

FIG. 11 3D AFM images (top) and height profile (bottom) of perforated double layer graphene coated with Pt using FIB; (A) Pt deposited using 150 μs and 1 pass, (B) Pt deposited using 250 μs and 1 pass, (C) Pt deposited using 350 μs and 1 pass, (D) Pt deposited using 450 μs and 1 pass. Red line indicates where line profile was taken and blue square shows Pt deposited area. Roughness of the Pt layer increases as the dwell time increases. Pt layer also becomes more visible as it gets thicker.

FIG. 13 SEM images of four $SiN_x$ pores with PG-2 after deposition of 50-nm Pd thin film over 300-mesh TEM grids (G/Pd-MI-2).

FIG. 18 shows $H_2/CO_2$ separation factor at different feed gas ratio vs thickness of the deposited microislands for G/Ni-600 membranes. Even the permeance drop is not very significant the separation factor has increased more than 5 times of Knudsen selectivity.

Hereinafter, preferred embodiments of the device of the invention are described, in order to illustrate the invention, without any intention to limit the scope of the present invention.

DETAILED DESCRIPTION OF THE PREFERRED EMBODIMENTS

The present invention relates to a membrane assembly, which is useful for the separation of gases, preferably for the adsorptive separation of gases.

Figures 1, 3:
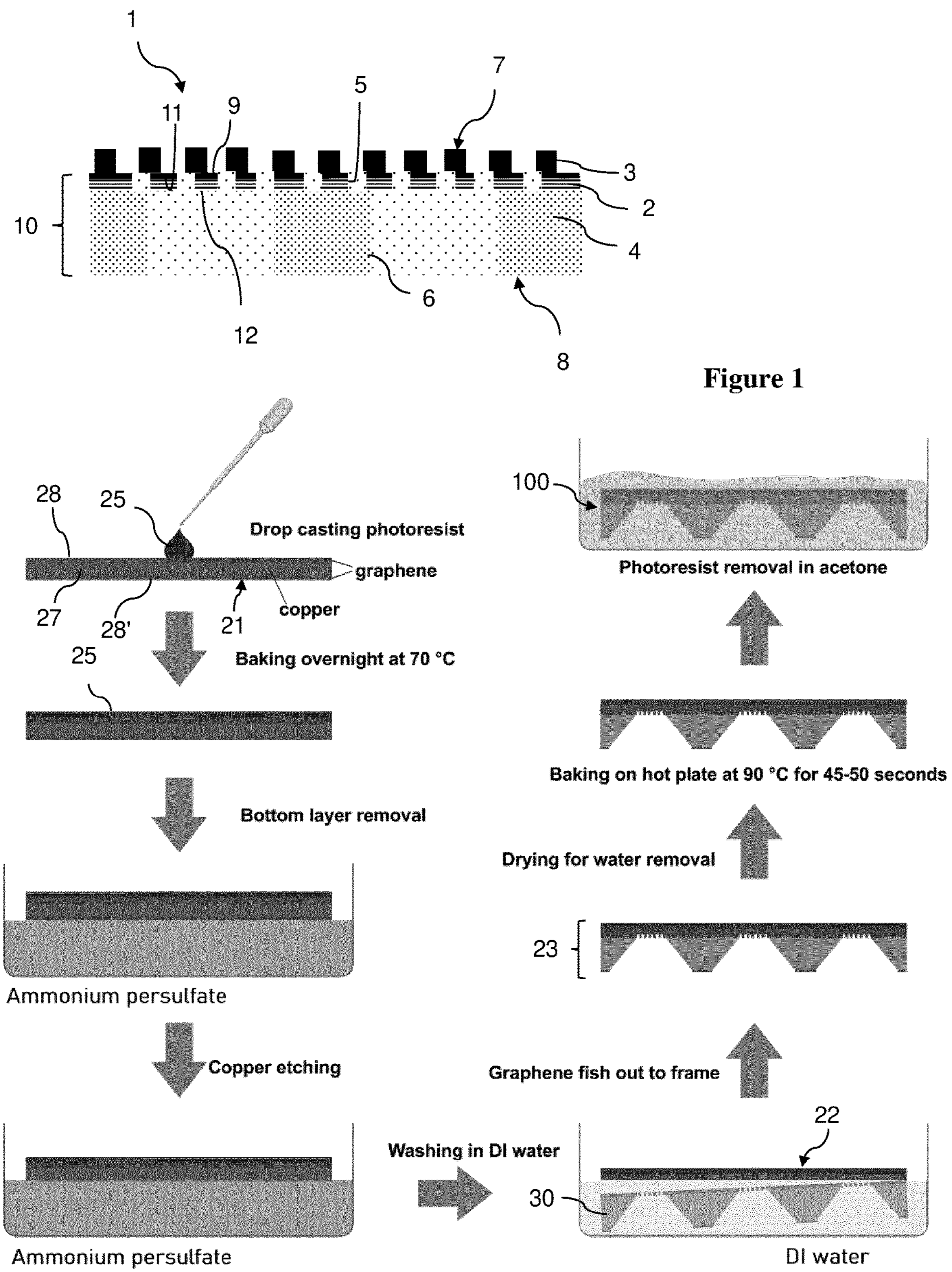
FIG. 1 schematically shows a cross-section of a membrane assembly in accordance with an embodiment of the invention.
FIG. 3 shows the detailed schematics of graphene transfer procedure using a new facile method based on thick layer of sacrificial photoresist. This technique can be also extended to nonporous supports such as $SiO_2$, glass and etc.

FIG. 1 schematically illustrates a cross-section of a membrane assembly 1 in accordance with an embodiment of the invention. The vertical section plane in FIG. 1 is perpendicular to the opposed first and second sides 7, 8, of the membrane assembly 1, said first and second sides appearing as upper and lower sides 7, 8, respectively, in the illustration of FIG. 1.

The membrane assembly 1 comprises a porous membrane 2. On the first side 7, the membrane assembly comprises a gas-affinity material 3. The gas-affinity material 3 is preferably non-continuously deposited on said porous membrane 2 and/or is of irregular thickness, when shown in cross-section as shown in FIG. 1.

In an embodiment, the membrane assembly 1 further comprises a porous substrate 4, wherein said porous membrane is in contact with, for example placed or deposited on, said porous substrate, and wherein said porous substrate is preferably permeable to the gases in said mixture of gases.

In an embodiment, the membrane assembly 1 comprises first and second sides 7, 8 wherein at the first side 7, the membrane assembly comprises said gas-affinity material 3, and wherein at the second side 8, said the membrane assembly comprises said porous substrate 4, and wherein said porous membrane 2 is provided between said gas-affinity material 3 and said porous substrate, and wherein said first side is intended for exposure to said mixture of gases.

The mixture of gases preferably comprises at least two different gases, wherein at least one gas is to be separated from said mixture of gases. In an embodiment, the mixture of gases comprises a first gas and a second gas, wherein the membrane assembly is provided for separating said first gas from said second gas. Preferably, the membrane assembly is permeable to said second gas but substantially impermeable to said first gas, for example during the operation of the membrane assembly. In an embodiment, the membrane assembly exhibits saturation and may exhibit altered permeability characteristics once it is saturated.

In an embodiment, said gas to be separated from a mixture of gases is a first gas, wherein said mixture comprises at least a second gas, wherein said porous membrane 2 is permeable to said second gas, such that said gas-separation membrane is suitable to separate said first gas from said second gas by adsorbing, absorbing and/or dissolving said first gas and thereby preventing said first gas from passing through said gas-separation assembly.

In an embodiment, said gas-affinity material does not adsorb, absorb and/or dissolve said second gas, or does adsorb, absorb and/or dissolve said second gas to a lesser extent than said first gas. For example, said gas-affinity material adsorbs, absorbs and/or dissolves said second gas at least half as efficiently than the first gas, preferably 10 time less efficiently and most preferably 100 times less efficiently than the first gas.

Preferably, the membrane assembly separates gases, such as said first and second gases, by adsorptive separation. Preferably, the invention does not require (but may make use of) molecular sieving as a gas separation mechanism and is therefore advantageously suitable to separate first and second gases having similar sizes, for example, similar kinetic diameters and/or molecular weights.

For example, in some embodiments, the second gas that permeates through the membrane assembly has a kinetic diameter that is larger than that of the first gas, which is retained by the membrane.

For example, in some embodiments, the second gas that permeates through the membrane assembly has a molecular weight that is larger than that of the first gas, which is retained by the membrane.

In an embodiment, the first gas has a larger kinetic diameter and a smaller molecular weight than said second gas. In another embodiment, the first gas has a smaller kinetic diameter and a larger molecular weight than said second gas. Turning back to FIG. 1, the membrane 2 is provided on a porous substrate 4. The porous substrate 4 is generally thicker than the porous membrane 2, and preferably provides the support of the porous membrane 2 and preferably of the entire membrane assembly. Thanks to the substrate 4, the overall membrane assembly is more or less rigid and/or flexible, can be conveniently handled and/or used as a gas separation membrane in gas separation devices or installations, for example.

In an embodiment, said porous membrane comprises first and second sides 11, 12, wherein on the first side 11, said gas-affinity material 3 is provided on said porous membrane 2 or on an optional intermediate layer 9 deposited on said porous membrane, and wherein on the second side 12, said porous membrane 2 is deposited on the porous substrate 4.

The membrane assembly 1 optionally comprises one or more intermediate layers 9, wherein said one or more intermediate layers 9, if present, is deposited directly on the first side 11 of the porous membrane 2, so as to be in direct contact with the porous membrane 2. In this case, the gas affinity material 3 is preferably deposited directly on said intermediate layer 9, so as to be in contact with the intermediate layer. The intermediate layer 9 is preferably made of the same material as the gas-affinity material, and is preferably deposited on the porous membrane 2 before the gas-affinity material is deposited thereon. The invention does not exclude the possibility that the intermediate layer 9 is made from a material other than said gas-affinity material 3.

The intermediate layer 9, if present, generally follows the topography of the porous membrane 2 in that it does not affect the size of the pores in a significant manner or in a manner that affects permeability of the membrane.

The intermediate layer 9 may also be considered to be part of the porous membrane 2, in which case the porous membrane is a multilayer and multi-material porous membrane. Alternatively, intermediate layer 9 may also be considered to be part of the gas-affinity material, given that the intermediate layer 9 is preferably made from the same material. In this latter case, the gas-affinity material forms a porous layer 9 on the porous membrane (following the pores of the porous membrane 2) and further forms raised areas 3, said raised areas emerging on the first said 7 of the membrane assembly.

Preferably the first side 7 of the membrane assembly 1 is intended for exposure to said mixture of gases. With respect to the porous membrane 2, it is preferably the first side 11 of the porous membrane 2, comprising said gas-affinity material 3 or said intermediate layer 9, which is intended for exposure to said mixture of gases. Preferably, the first sides 7, 11 are exposed to the unseparated mixture of gases when the membrane assembly is used for gas separation. Accordingly, at least one separated gas can be selected on the second side 8 of the membrane assembly 1 and/or on the second side 12 of the membrane 2.

The pores 6 in the substrate 4 are preferably larger than the pores 5 provided in the porous membrane 2, and the main function of the pores 6 is thus to not hinder gas-diffusion and/or separation in accordance with the invention. In an embodiment, the pores 5 in the porous membrane 2 are preferably smaller than the pores 6 in the porous substrate 4. Preferably, the pores 5 in the membrane 2 do preferably not or not totally prevent the diffusion of the gases of the mixture of gases through the membrane assembly.

Figure 2:
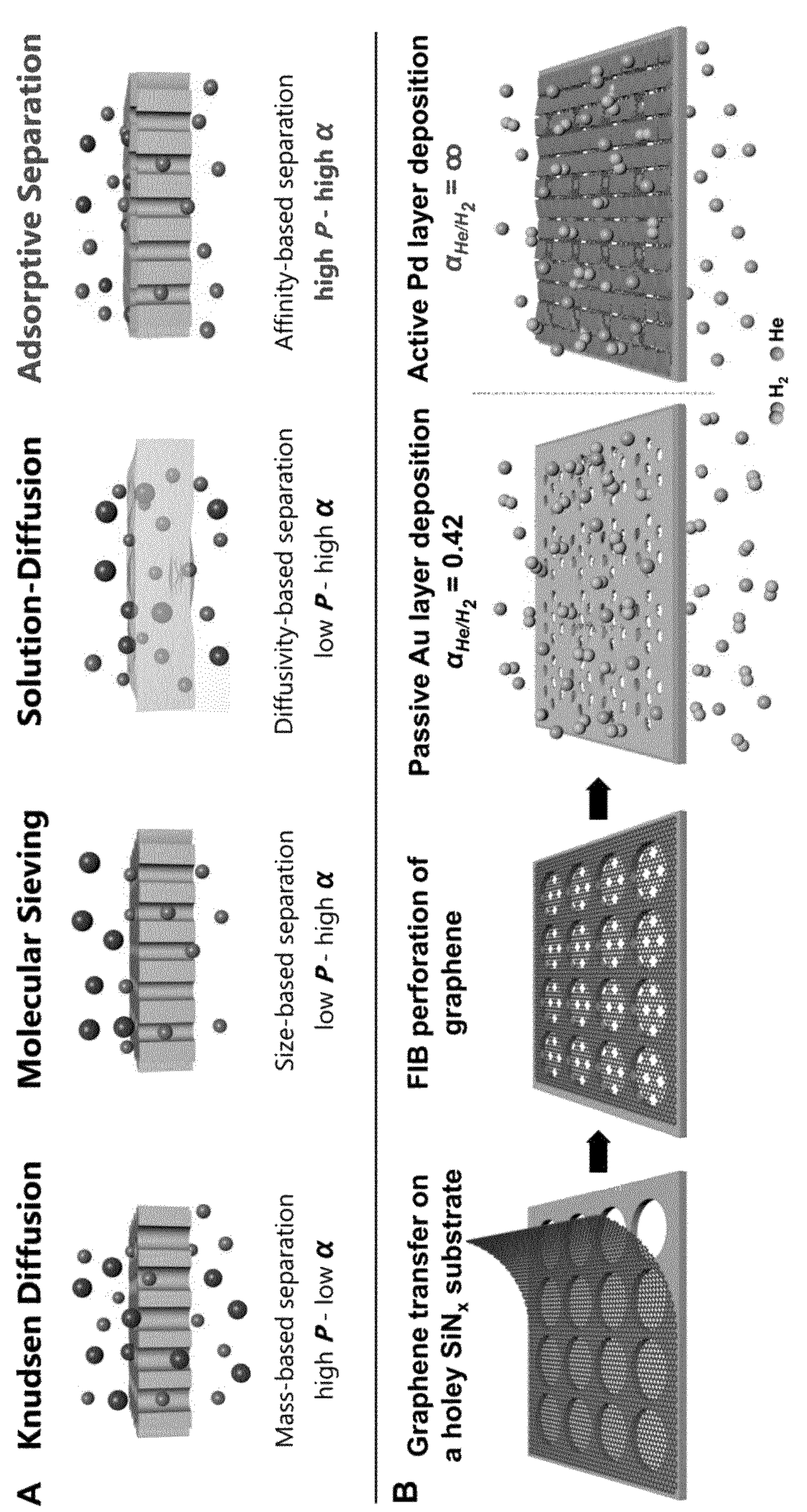
FIG. 2, panels A and B show gas separation mechanisms using conventional membranes and the fabrication of adsorptive membranes for affinity-based separation, respectively. A) Membrane gas separation mechanisms: (from left to right) Knudsen diffusion occurs when the membrane pores are equal or smaller than the mean free path of the gas and the selectivity is limited to the square root of the mass ratios of components. Molecular sieving occurs when the pores are small enough to allow only one component in the mixture to pass, however the permeance is low due to very small pore size. Solution diffusion occurs when the solubility of the components in the membrane is different and separation occurs due to the difference in diffusivity, however, permeance is usually low due to the dense membrane structure. Adsorptive separation occurs when one of the components in the gas mixture is selectively retained without the loss of permeance. B) Fabrication sequence of catalytic membrane with ultra-high permeance and infinite selectivity: First, graphene is transferred onto holey $SiN_x$ substrate and perforated using FIB. Then active Pd microislands are deposited using TEM Cu grid as a structural template to selectively trap $H_2$ in the He/$H_2$ mixture providing up to infinite He/$H_2$ selectivity. Deposition of passive Au layer does not affect the selectivity.

Accordingly, one or both of the pores 5 and 6 are preferably not provided to enable gas-separation by molecular sieving as illustrated in FIG. 2, panel A. In an embodiment, the pores 5 in the porous membrane 2 are not provided to retain a gas of a mixture of gases on one side of the membrane, such as based on size-based separation.

In an embodiment, the porous membrane 2 is permeable to at least two gases in said mixture of gases, preferably to all gases of the mixture of gases. In an embodiment, in the absence of the gas-affinity material 3, the gases of the mixture of gases may diffuse through the membrane 2 by Knudsen diffusion.

In an embodiment, the pores 5 of the porous membrane 2 have an average diameter of 1 nm to 500 nm, preferably 2 nm to 200 nm, more preferably 3 nm to 100 nm, even more preferably 4 nm to 80 nm and most preferably 5 nm to 50 nm. The pore size may be determined by as described in the examples below, for example using images obtained by SEM at 0.5 kV accelerating voltage and 0.40 nA, or by TEM (FEI Technai Osiris) at 200.0 accelerating voltage. The pore size distribution may be assessed using ImageJ software.

In an embodiment, the porous membrane comprises pores having an average diameter of 10 nm or larger than 10 nm, for example larger than 11 nm, 12 nm, 13 nm, 14 nm or 15 nm.

For the purpose of this specification, "mean" or "average" sizes, for example pore sizes, are arithmetic means, preferably based on a representative number of spores, for example based on the analysis of the spores on a sample membrane.

If the size of the pores 5 of the porous membrane 2 is assessed before the deposition of the gas-affinity material 3, the pore-sizes may apply for the porous membrane 2 specifically, or, if one or more intermediate layers 9 are present, the pore-sizes may apply for the porous membrane 2 comprising the intermediate layer(s) 9.

Preferably, however, the size of the pores 5 in the porous membrane 2 is assessed with the gas-affinity material 3 being already deposited on the porous membrane 2. In other words, the size of the pores 5 in the porous membrane 2 is assessed for the final membrane assembly 1. The deposition of the gas-affinity material 3 generally results in a reduction of the size of the pores 5 in the porous membrane 2. The above indicated dimensions of the pore sizes preferably apply to the final membrane assembly 1.

In an embodiment, the thickness of the porous membrane 2 is 1-500 nm, preferably 1-200 nm, more preferably 1-100 nm, and most preferably 1-50 nm.

In a preferred embodiment, the thickness of the porous membrane 2 is 1-20 nm, preferably 1.5-10 nm, more preferably 1.5-5 nm, most preferably 2-4 nm.

In an embodiment of the membrane assembly, the porous membrane comprises a porous two-dimensional membrane material.

In an embodiment, said porous two-dimensional membrane material is selected from the group of carbon-based two-dimensional membrane materials, hybrid two-dimensional membrane materials, organic two-dimensional membrane materials and inorganic two-dimensional membrane materials.

In an embodiment, said carbon-based two-dimensional membrane material is selected from graphene and from graphene oxide.

In an embodiment, said hybrid two-dimensional membrane materials are selected from metal organic frameworks (MOFs).

In an embodiment, said organic two-dimensional membrane materials are selected from covalent organic frameworks (COFs).

In an embodiment, said inorganic two-dimensional membrane materials are selected from MXene, layered double hydroxide, zeolite, layered silicate, transition metal dichalcogenides (TMDs) and hexagonal-Boron Nitride (h-BN).

In an embodiment, said porous membrane 2 is preferably resistant to temperatures of 1-250° C., preferably to temperatures up to 250° C., more preferably to temperatures up to 300° C.

In an embodiment, the porous membrane 2 is resistant to, that is, supports, temperatures of at least from 1° C. to 200° C., preferably 1° C. to 250° C., more preferably 1° C. to 270° C., most preferably 1° C. to 300° C. The terms "resistant to", "supports" and "withstands" mean that the membrane does not suffer from a loss of functionality and physical damage due to the exposure to the temperatures as indicated.

The porous substrate 4 and the gas-affinity material 3 are used with the membrane 2 as part of then membrane assembly 1 and have thus, independently, the same requirements with respect to temperature. It is noted that the temperatures of 150° C.-300° C., preferably about 200° C.-280° C., most preferably 230-270° C., are in particular used when the membrane is subjected to a thermal regeneration as described in more detail elsewhere in this specification.

In an embodiment, said porous substrate 4 comprises pores 6 having a mean size of 10 nm-30 μm, preferably 50 nm-20 μm, more preferably 100 nm to 15 μm, most preferably 200 nm to 10 μm.

Preferably, the invention is not limited with respect to the thickness of the porous substrate. In an embodiment, said porous substrate 4 has a thickness of 100 nm to 100 μm.

In an embodiment, the porous substrate 4 has a thickness of 50 μm to 15 mm, preferably 100 μm to 10 mm, more preferably 200 μm to 5 mm, even more preferably 300 μm to 3 mm μm, most preferably 350 μm to 1 mm. In a particular embodiment, the porous substrate has a thickness of 0.4 to 0.8 mm.

In an embodiment, the porous substrate is selected from any material that can harbour pores 6 as defined above and that can withstand or support temperatures required for thermal regeneration, for example up to 200° C., preferably 250° C., as indicated herein above and elsewhere in this specification.

In an embodiment, said porous substrate comprises or consists essentially of a material selected from holey silicon nitride, silicon oxide materials, aluminium oxide materials, and polymers, in particular polymers withstanding temperatures as indicated elsewhere in this specification.

Exemplary materials which of which the porous substrate may comprise or consist essentially of include one or more selected from the group consisting of: silicon nitride, anodic aluminium oxide, and nanoporous carbon mesh, polymers withstanding temperatures from 1° C. to 200° C., preferably from 1° C. to 250° C., more preferably from 1° C. to 270° C., most preferably 1° C. to 300° C. For example, said polymers are organic polymers.

In a preferred embodiment, the porous substrate comprises or consist essentially of holey silicon nitride, such as SiNx, for example as described in the experimental section.

The gas-affinity material 3 is preferably a material that has an affinity for at least one gas but not all of the gases in the mixture of gases, such that said at least one gas will bind to, dissolve in, adsorb and/or absorb in and/or on said gas-affinity material, during the operation of the membrane assembly, in particular at the operation temperature and/or pressure of the membrane assembly 1. Preferably, the gas-affinity material 3 is preferably a material that has an affinity for at least said first gas.

In an embodiment, the gas-affinity material 3 is or comprises and or consists essentially of a metal. In an embodiment, the gas-affinity material 3 is selected from a material comprising and/or essentially consisting of one or more selected from the group consisting of: palladium (Pd), platinum (Pt), nickel (Ni), copper (Cu), iron (Fe), cobalt (Co) and alloys comprising one or more of the aforementioned. If the gas-affinity material comprises a metal, said metal is preferably present in a metallic, elementary and/or non-oxidized form.

The gas-affinity material 3 is selected depending on the specific gas or gases to be retained by the gas-affinity material 3 and thus by the gas that is to be prevented from diffusing through the membrane assembly 1.

In a preferred embodiment, the gas-affinity material comprises one or more selected from palladium (Pd), platinum (Pt), and nickel (Ni).

The intermediate layer 9, if present, preferably comprises and/or consists of the same material as said-gas-affinity material.

In an embodiment, said gas-affinity material 3 comprises one or more selected from the group consisting of: (i) separated raised areas of said gas-affinity material, (ii) pores, and (iii) a film comprising areas of reduced thickness. In an embodiment, said gas-affinity material 3 comprises pores and further forms one or both selected from a film comprising areas of reduced thickness and separated raised areas.

In said areas of reduced thickness, a thickness of the gas-affinity material is preferably from 0-50 nm, preferably 0.1-20 nm, more preferably 0.5-15 nm and most preferably 1-10 nm, for example 2-8 nm.

In a preferred embodiment, said gas-affinity material comprises separated and/or isolated areas. Preferably, said gas-affinity material forms separated raised areas, such as ridges, bumps and/or oriels. Said raised areas are preferably separated by a distance with respect to each other, thereby forming the separate raised areas. The raised areas are preferably deposited directly on the membrane 2 and/or on an intermediate layer 9 that is deposited on the membrane, for example.

Said gas-affinity material is preferably associated with a first side 11 of said membrane (FIG. 1), for example deposited directly on said porous membrane or indirectly on said membrane, for example, the gas-affinity material is deposited on an intermediate layer 9, wherein one or more intermediate layers 9 are deposited on the porous membrane. Such separated areas are illustrated, for example, in FIG. 1, but also in FIG. 15, panels A-C, which show SEM images. Such separated, raised areas can be prepared, for example, by using a mesh when depositing the gas-affinity material.

The raised areas of the gas-affinity material preferably emerge from and/or are prominent on the first side 11 of the porous membrane 2 and/or of the one or more intermediate layers 9 deposited on the porous membrane 2.

Even though the gas-affinity material may be discontinuous and/or of various thickness, for example as defined elsewhere in this specification, it may generally be considered as being a layer, for example a gas-affinity layer or an adsorptive layer.

In an embodiment, said gas-affinity material has a thickness of from 2-500 nm, preferably 5-300 nm, more preferably 10-200 nm. These values preferably apply to the thickness (or height) of said raised areas.

In a preferred embodiment, said gas-affinity material has a thickness of from 5-500 nm, preferably 10-300 nm, more preferably 15-200 nm, and most preferably 40-160 nm. These values preferably apply to the thickness (or height) of said raised areas.

In an embodiment, the thicknesses of the gas-affinity material as indicated above include the thickness of the optional intermediate layer 9.

Figure 17:
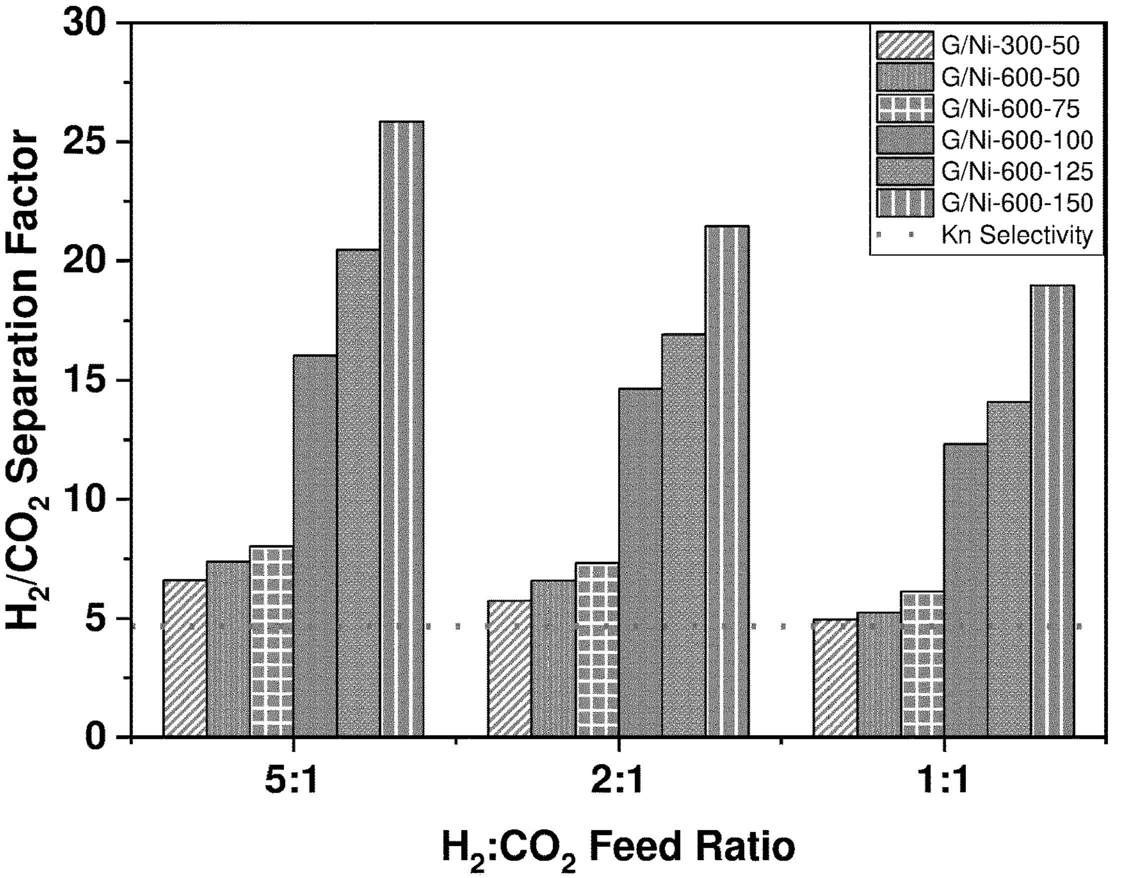
FIG. 17 shows $H_2/CO_2$ separation factor vs $H_2$:$CO_2$ feed ratio for G/Ni-membranes with different thickness and nanoislands structure. Here it can be seen that the $H_2/CO_2$ separation factor was able to rise above 25.
Figure 19:
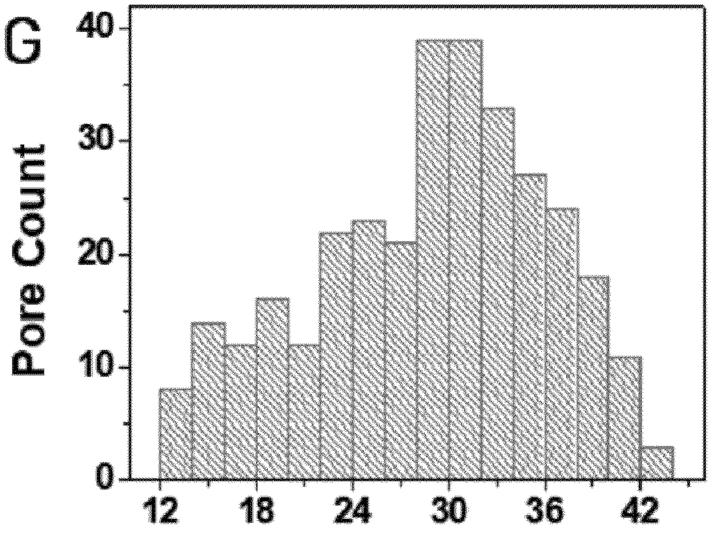
FIG. 19 shows electron microscopy characterization of adsorptive membranes. SEM images of A) four and B) single 650 nm $SiN_x$ pores covered with perforated graphene after being coated with 125 nm of Ni microislands (G/Ni-600-125), C) four and D) single 650 nm $SiN_x$ pores covered with perforated graphene after being coated with 150 nm of Ni microislands (G/Ni-600-150), E) Ni microislands obtained by 50 nm Ni deposition over 300-mesh Cu grids (G/Ni-300-50), F) Ni microislands obtained by 125 nm Ni deposition over 600-mesh Cu grids (G/Ni-600-125), G) Pore size distribution histogram of SEM images in A and H) in C calculated using ImageJ. Note: SEM images were digitally enhanced in order to better visualize the graphene holes.
Figure 19:
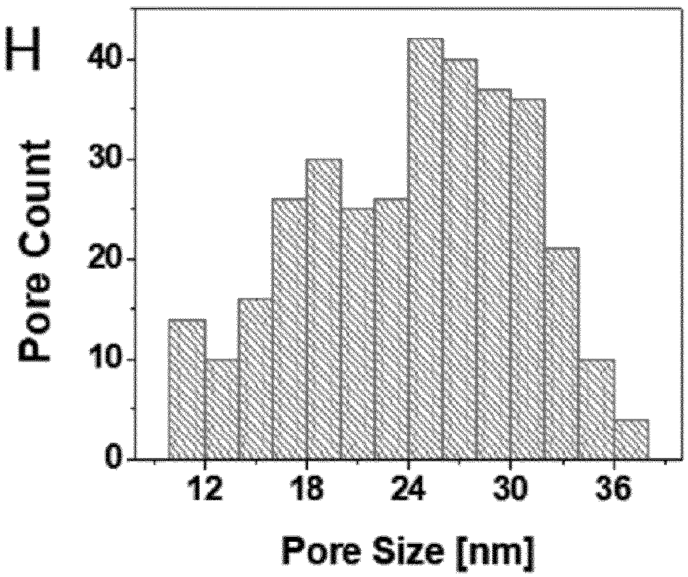

Exemplary thicknesses of the gas-affinity material are 50 nm, 75 nm, 100 nm, 125 nm, or 150 nm, as in the embodiment shown in Example 8 and FIG. 17. These thicknesses do not include, however, the thickness of the intermediate layer of 5 nm in this example.

In an embodiment, said separated areas of said gas-affinity material are areas of 1-100,000 $\mu m^2$, preferably 1-90,000 $\mu m^2$, more preferably 4-40,000 $\mu m^2$, even more preferably 4-22,500 $\mu m^2$, and most preferably 9-10,000 $\mu m^2$, for example 16-6,400 $\mu m^2$.

In an embodiment, said separated areas are substantially squares or rectangles, having mean side lengths of 1-300

μm, more preferably 2-150 μm, even more preferably 3-100 μm, and most preferably 5-80 μm.

In an embodiment, said separated areas form islands, preferably micro- or nanoislands. Preferably, said islands are formed on and/or emerge from said porous membrane or the optional intermediate layer 9.

In an embodiment, said separated areas are separated by a distance of 0.1-50 μm, preferably 0.2-30 μm, most preferably 0.3-10 μm.

In another embodiment, said membrane assembly 1 comprises a porous layer 3 comprising said gas-affinity material 3 on the side of the first side 11 of said membrane 2. Preferably, said gas-affinity material 3 forms a porous layer.

In an embodiment, pores of said gas-affinity material 3, if present have a mean diameter of 5 nm-200 μm, preferably 8 nm-150 μm, more preferably 10 nm-100 μm, and most preferably nm-80 μm.

The invention also encompasses a method for preparing the membrane assembly 1 according to the invention. The method preferably comprises: providing an assembly comprising a membrane 2 on a porous substrate 4. This assembly may be a "precursor assembly" and/or a membrane assembly 100 as described in more detail with respect to FIG. 3. This (precursor) membrane assembly 100 preferably lacks the gas-affinity material 3.

If the membrane 2 does not yet comprise pores 5 as required for separating gases in accordance with the invention, the method preferably comprises providing pores 5 in said membrane 2, thereby obtaining a porous membrane 2. Such pores may be produced, for example, by focused ion beam (FIB) selected, for example. Of course, other methods for producing pores in membranes may be used, for example ion track techniques, etching methods, drilling, and so forth. Specific techniques may be selected from UV plasma etching, $O_2$ plasma etching with or without porous template, chemical etching (for example of graphene or graphene oxide membranes), for example. A membrane may also be prepared from the beginning to comprise pores, for example preparation using template nanoparticles, salts, oxides etc. during the growth of the membrane, such as the growth of a graphene membrane, for example.

The method for preparing the membrane assembly 1 may comprise depositing an intermediate layer 9 on the membrane 2. The intermediate layer may be deposited, for example, by Physical Vapor Deposition, just to mention an example. The intermediate layer 9 may in principle be deposited as the gas-affinity material 3, given that it is made from the same material, but without using a template, for example (see below).

The method for preparing the membrane assembly 1 preferably further comprises: depositing said gas-affinity material 3 on said porous membrane 2 or on side intermediate layer 9, if present.

Preferably, said gas-affinity material 3 is non-continuously deposited and/or is deposited so as to be of irregular and/or varying thickness. The term "non-continuously" deposited is meant to encompass that there are holes in a layer of said gas-affinity material 3 or that the gas-affinity material 3 is deposited in the form of separate raised areas. These isolated or separated raised areas may be obtained, for example, through the deposition through a mesh having the appropriate mesh size. In an embodiment, 300-mesh TEM grids are used for depositing the isolated areas of the gas-affinity material. In another embodiment, a 600 mesh-grid or a 2000-mesh TEM grid is used for depositing the separated raised areas of the gas-affinity material. More generally, mesh grids of any size between 200-5000, preferably between 300-2000 may be used.

If the gas-affinity material 3 is deposited so as to be of irregular and/or varying thickness, it preferably encompasses a thickness range, for example 1-500 nm, preferably 5-300 nm, more preferably 10-200 nm, such that the thickness varies within the indicated range preferably in a regular manner, for example due to the regular distribution of raised areas of said gas-affinity material.

In an embodiment, the mesh grid defines holes having a mean diameter of 1-200 μm, preferably 5-100 μm, more preferably 10-80 μm. The mesh grid may define rectangular, hexagonal or circular holes, for example.

In an embodiment, the mesh grid is a copper (Cu) mesh grid.

The invention also relates to a method for preparing a membrane assembly 100 (FIG. 3), which may be used as a precursor membrane assembly or membrane subassembly prior to the creation of pores in the porous membrane and/or prior to the deposition of the gas-affinity material 3 on said porous membrane 2, as described above.

The method for preparing a membrane assembly 100 is illustrated in FIG. 3. In this membrane assembly, the pores 5 in the membrane have not yet been formed, and the gas affinity material 3 has not yet been deposited.

The method preferably comprises providing a first subassembly 21 comprising a membrane 28 deposited on a first side of a provisional membrane substrate 27. The first subassembly may be, for example, a provisional metal substrate on which a graphene or other 2D-material has been deposited. The provisional substrate is provided in order to grow or deposit the membrane 28. The provisional substrate for depositing the 2D materials are typically selected from rhodium, silicon carbide (SiC), copper, iron and nickel. The provisional substrate is preferably selected for growing, for example, a graphene membrane. The aforementioned materials are preferably provided as a foil for growing the membrane, wherein the foil is said provisional substrate. For example, when a copper foil 27 is used for growing a graphene membrane 28, a second membrane 28' is formed on a second side of the copper foil, wherein said second membrane 28' is generally not required for further use and will be removed in a subsequent step.

The method for producing the membrane assembly 100 preferably comprises depositing a transfer material 25 on said membrane 28. A preferred transfer material is photoresist.

Preferably, a layer of 500 μm or larger is deposited on said membrane. More preferably, a layer of ≥600 μm, even more preferably ≥700 μm, and most preferably ≥800 μm is deposited. The layer may have a thickness of up to 10 mm, preferably up to 5 mm, most preferably up to 3 mm, for example.

Preferably, the viscosity of the photoresist is sufficiently high to allow deposition other than by spin-coating, such that spin-coating is not required. Preferably, the transfer material has sufficient viscosity to allow deposition by drop casting and/or printing techniques.

The transfer material may be selected from photoresist materials, preferably from positive photoresist materials. An exemplary photoresist is Microposit S1813 positive photoresist commercially available from Dow Chemical Company.

In an embodiment, the photoresist comprises 50-90% solvent, for example propylene glycol monomethyl ether acetate, 5-35% novolak resin, and 0.5-15% of photoactive compound, preferably diazo photoactive compound, and optionally minor amounts (smaller than 1%) of cresol, non-ionic surfactant and methoxy-1-propanol acetate. The diazo photoactive compound is preferably diazonaphthoquinone.

Preferably, the transfer material, such as the photoresist, is completely dissolvable in acetone.

Preferably, the transfer material remains chemically inert with respect to the membrane 28 and/or the porous membrane and does not form covalent bonds with the membrane 28.

The advantage of the photoresist material is that it allows for easy deposition and also convenient removal in subsequent steps. For example, compared to poly(methyl)methacrylate (PMMA), the photoresist material does not require deposition by spin coating, and can thus be deposited without an expensive spin-coater. In contrast to PMMA, the photoresist material does not form covalent interactions with a graphene membrane, for example.

The method for producing the membrane assembly 100 preferably comprises removing said provisional membrane substrate 27 and, if present, an optionally present membrane 28' provided on a second side of said provisional membrane substrate 27, thereby obtaining a second subassembly 22 comprising said photoresist material 25 and said membrane 28.

The provisional membrane substrate 27 and, if present, an optionally present membrane 28', may be removed preferably by etching, preferably wet-etching, for example by immerging the first subassembly further comprising said photoresist material 25 in an appropriate etching bath, for example an oxidizing bath, such as ammonium persulfate bath as illustrated in FIG. 3.

In an embodiment, the method comprises washing said second subassembly 22, preferably in a cleaning medium or solution, which is preferably a liquid cleaning medium or solution. Preferably, the liquid washing medium comprises or consists of pure or deionized water.

In an embodiment, the method comprises placing second subassembly 22 on a substrate of choice 30. In some embodiments, the substrate of choice is a porous substrate, which preferably corresponds to the porous substrate 4 of the membrane assembly 1 as illustrated in FIG. 1.

In an embodiment, washing said second subassembly 22 and placing said second subassembly 22 onto the substrate of choice 30 comprises:

- transferring said second subassembly 22 in a cleaning bath, preferably comprising water; and,
- placing said substrate of choice 30 below said second subassembly 22 in said cleaning bath; and,
- raising said substrate of choice 30 from said bath with the second subassembly 22 being on a first surface of said porous substrate.

The method for producing the membrane assembly 100 preferably comprises placing said second subassembly 22 on said substrate of choice 30, so as to obtain a third subassembly 23 comprising said substrate of choice 30 and said second subassembly 22. For example, the substrate of choice 30 may be used to fish the second subassembly out of a washing bath used to wash the second subassembly. Preferred embodiments of such a method are disclosed herein below.

In an embodiment, the method comprises annealing the third subassembly 23, preferably at a temperature of higher than 30° C. The annealing preferably takes place at a temperature of 30-300° C., preferably 40-200° C. more preferably 50-150° C., most preferably 60-100° C.

Preferably, the annealing results in removing residual washing medium and making the membrane 28 of the second subassembly to adhere to substrate of choice 30.

In an embodiment, the method comprises dissolving the photoresist material 25 of the third subassembly 23 and thereby obtaining said membrane assembly 100 or precursor membrane assembly. For example, the third subassembly 23 may be immerged in a solution suitable to dissolve specifically said photoresist material. For example, acetone may be used for dissolving said photoresist material.

The method of the invention may be adapted to deposit a plurality of layers of said membrane 28 on said substrate of choice 30. In an embodiment, a plurality of layers is two or more layers, preferably 2-100 layers, more preferably 2-10 layers.

For example, two graphene membranes or graphene layers (a double-layer membrane) may be deposited on said substrate of choice 30, thereby obtaining a double graphene layer deposited on a porous substrate, for example. In order to do so, the initial steps of the method for preparing the preparing a membrane assembly 100 are restarted anew, but the second subassembly is removed from the cleaning bath by using the previously prepared membrane assembly 100, such that the second subassembly is now placed on the previously prepared membrane assembly 100 instead of the substrate of choice 30 alone.

These additional steps may be described by way of the following embodiments:

In an embodiment for producing a membrane assembly, wherein said membrane 28 is a first membrane layer 28, and wherein the method further comprises:

- obtaining a fourth subassembly according to the method indicated above for obtaining said second subassembly 22, wherein said forth subassembly comprises photoresist material deposited on a second membrane layer;
- placing the fourth subassembly onto the membrane assembly 100 obtained according to the method indicated above, thereby obtaining a fifth subassembly comprising said membrane assembly 100 and said fourth subassembly;
- annealing the fifth subassembly, preferably at a temperature of higher than 30° C.;
- dissolving the photoresist of the fifth subassembly and thereby obtaining a membrane assembly comprising a membrane comprising two membrane layers.

Per analogy with what has been described above, the method comprises washing the fourth subassembly, preferably in a cleaning medium or solution, which may be pure or deionized water.

The step of placing the fourth subassembly onto the membrane assembly 100 may be conducted in the same manner as described above for placing said second subassembly 22 onto the substrate of choice 30, namely transferring the fourth subassembly in a cleaning bath, placing the membrane assembly 100 below said fourth subassembly 22 in said cleaning bath; and, raising said membrane assembly 100 from said bath with the fourth subassembly being on a first surface of said membrane assembly 100. In particular, the fourth subassembly is on top of the membrane 28 of the membrane assembly 100.

The annealing step and subsequent removal of photoresist material may be conducted as described herein above with respect to the third subassembly (e.g. immersion in acetone).

These steps may be repeated until a plurality of layers of the membrane 28 have been deposited. In all examples, a subassembly comprising or consisting of a new membrane and photoresist material is placed on the previously generated membrane assembly, followed preferably by annealing (FIG. 3). At the end, the photoresist material is removed to obtain the membrane assembly comprising one further membrane.

The invention also relates to methods for separating one or more gases from a mixture of gases. The invention also relates to the use of the membrane assembly as a gas-separation membrane and/or for the separation of gases.

Preferably, the first side 7 of the membrane assembly 1 is exposed to a mixture of gases comprising two or more gases (FIG. 1). The first side is preferably the side which comprises the non-continuously deposited gas-affinity material 3. The mixture of gases is thus exposed to said first side of said membrane assembly 1.

Optionally, the mixture of gases may be pressurized. There is thus a comparatively higher gas-pressure on the first side 7 of the membrane assembly compared to the second side 8 of the membrane assembly. The porous substrate 4 is preferably provided to resist such a pressure gradient and to prevent damage to the membrane assembly during operation.

Thanks to the affinity of the gas-affinity material 3 to at least one but not all of the gases in the mixture of gases, at least one gas is retained by said gas-affinity material and will not diffuse through the membrane assembly. One or more other gases, however, are not retained by the gas-affinity material 3 and can diffuse through the membrane, mainly through the pores 5, 6, provided in the membrane 2 and/or in the porous substrate 4.

During operation, at least one of the gases of the mixture of gases is absorbed by said gas-affinity material. The gas-affinity material is preferably selected in dependence of the gas mixture and/or of the gas to be retained by the gas-affinity material.

In an embodiment, the mixture of gases comprises hydrogen gas ($H_2$), wherein the hydrogen gas is to be adsorbed or otherwise retained by the gas-affinity material. In this case, the gas-affinity material preferably comprises and/or consists essentially of one or more selected from the group consisting of: of platinum (Pt) and palladium (Pd), and alloys comprising one or both of the aforementioned.

In embodiments where hydrogen gas is to be adsorbed or otherwise retained by the gas-affinity material, the mixture of gases may comprise He and $H_2$, for example. $H_2$ may be considered a first gas and He a second gas in accordance with certain embodiments. $H_2$ and He have kinetic diameters of 0.289 and 0.26 nm and molecular weights of 2 and 4, respectively, such that in this example, the slightly smaller but heavier He passes through the membrane assembly while the slightly larger but substantially lighter $H_2$ is retained.

Membrane assemblies comprising Pt and/or Pd (as gas-affinity material) may be used, for example, for gas mixtures of He and $H_2$. In the latter case, He will permeate through the membrane assembly during operation, while $H_2$ does not.

In an embodiment, the mixture of gases comprises carbon dioxide ($CO_2$), wherein the carbon dioxide is to be adsorbed or otherwise retained by the gas-affinity material. In this case, the gas-affinity material preferably comprises and/or consists essentially of one or more selected from the group consisting of: nickel (Ni), iron (Fe), cobalt (Co) and alloys comprising one or more of the aforementioned.

In embodiments where carbon dioxide is to be adsorbed or otherwise retained by the gas-affinity material, the mixture of gases may comprise $CO_2$ and $H_2$, for example, or any other mixture of gases comprising $CO_2$, such as atmospheric air, $CH_4/CO_2$, $N_2/CO_2$, $O_2/CO_2$, $He/CO_2$ mixtures.

A membrane assembly comprising Ni (as gas-affinity material) may be used, for example, for gas mixtures of $CO_2$ and $H_2$. Furthermore, Ni may be used for other Gas/$CO_2$ separation such as removal of $CO_2$ from natural gas ($CH_4/CO_2$ separation) and from post-combustion mixture ($N_2/CO_2$ and $O_2/CO_2$), He purification ($He/CO_2$ separation) and syngas purification ($H_2/CO_2$). The invention also encompasses separation of $CO_2$ from air (atmospheric air). In these cases, the components other than $CO_2$ of the gas mixture ($H_2$, $CH_4$, $N_2$, $O_2$, He, components of air other than $CO_2$, mainly $O_2$ and $N_2$, respectively, in the case of the cited examples) will permeate through the membrane assembly during operation, while $CO_2$ does not. $CO_2$ remains trapped by the gas-affinity material.

In an embodiment, the mixture of gases comprises hydrogen sulphide ($SH_2$). The hydrogen sulphide is to be adsorbed or otherwise retained by the gas-affinity material. In this case, the gas-affinity material preferably comprises and/or consists essentially of one or more selected from the group consisting of: copper (Cu), Iron (Fe), nickel (Ni) and alloys comprising one or more of the aforementioned.

In embodiments where $SH_2$ is to be adsorbed or otherwise retained by the gas-affinity material, the mixture of gases may comprise natural gas, or another mixture of gases comprising $CH_4$ and $SH_2$, for example. $SH_2$ may be considered a first gas and $CH_4$ a second gas in accordance with certain embodiments. $SH_2$ and $CH_4$ have kinetic diameters of 0.36 and 0.38 nm and molecular weights of 34 and 16, respectively, such that in this example, the larger but lighter second gas ($CH_4$) passes through the membrane assembly while the smaller but heavier $SH_2$ is retained.

A membrane assembly comprising copper (Cu), Iron (Fe), nickel (Ni) and alloys comprising one or more of the aforementioned (as gas-affinity material) may be used, for example, for natural gases and/or gas mixtures comprising $CH_4$ and $SH_2$, for example. In the latter case, $CH_4$ (or other components of natural gas) will permeate through the membrane assembly during operation, while $SH_2$ does not. $SH_2$ remains trapped by the gas-affinity material.

In an embodiment, the mixture of gases comprises ammonia ($NH_3$). The ammonia is to be adsorbed or otherwise retained by the gas-affinity material. In this case, the gas-affinity material preferably comprises and/or consists essentially of copper (Cu), Iron (Fe), nickel (Ni) and/or alloys comprising one or more of the aforementioned.

In embodiments where $NH_3$ is to be adsorbed or otherwise retained by the gas-affinity material, the mixture of gases may comprise $H_2$ and $NH_3$, for example. $N_2/NH_3$ separation is part of ammonia production processes.

A membrane assembly comprising copper (Cu), Iron (Fe), nickel (Ni) and alloys comprising one or more of the aforementioned (as gas-affinity material) may be used, for example, for gas mixtures comprising $H_2$ and $NH_3$ for example. In the latter case, $H_2$ (or other components of the gas mixture) will permeate through the membrane assembly during operation, while $NH_3$ does not. $NH_3$ remains trapped by the gas-affinity material.

In an embodiment, the membrane assembly 1 has an operating temperature in the range of −10° C. to 250° C., preferably 0° C. to 200° C., most preferably 0° C. to 100° C.

In a preferred embodiment, the membrane assembly 1 has an operating temperature in the range of −10° C. to 50° C.

In an embodiment, the membrane assembly 1 exhibits saturation when a specific amount of the gas to be separated is adsorbed, absorbed and/or dissolved by said gas-affinity material and wherein, when said saturation is reached, a permeate ratio of said membrane during operation changes in that the gas to be separated is no longer separated by said membrane and/or is less efficiently separated by said membrane.

In an embodiment, the concentration of the gas to be retained by the gas-affinity material is higher than the concentration of the other gases of the mixture of gases taken together. In an embodiment, the gas to be retained by the gas-affinity material provides >50 and up to 60 mol. % or up to 70 mol. % of all gases in the mixture of gases.

In another embodiment, the concentration of the gas to be retained by the gas-affinity material is lower than the concentration of the other gases of the mixture of gases taken together. In an embodiment, the gas to be retained by the gas-affinity material provides ≤50 mol. % of all gases in the mixture of gases, preferably ≤40 mol. % more preferably ≤30 mol. %, and most preferably ≤20 mol. %. Without wishing to be bound by theory, the inventors believe that the membrane assemblies of the invention are particularly suitable in separation of mixtures, where the gas to be retained by the gas-affinity material is a minor component of the mixture of gases. In some cases, the inventors have observed that the separation factor is higher when the gas to be retained by the gas-affinity material is a minor component of the mixture of gases.

Permeance is measured based on flow characteristics of the membrane. Initially, flow rate vs pressure is plotted then the slope of this curve is divided by the membrane area. The obtained value after the corresponding unit conversion is permeance, its SI unit is mol/m$^2$/s/Pa. However usually this number is very small, which is why gas permeation unit (GPU) may be used instead. 1 GPU=$3.35\times10^{-10}$ mol/m$^2$/s/Pa. This parameter shows how fast the separation will occur through the membrane at a given area and time.

In an embodiment, the membrane assembly of the invention, during operation, exhibits a permeance with respect to the permeating gas or gases of 500 GPU or higher. Preferably, at this permeance, the membrane assembly has a separation factor of 15 or higher, preferably 30 or higher, more preferably 70 or higher, even more preferably 100 or higher, and most preferably 250 or higher.

In an embodiment, the membrane assembly of the invention, during operation, exhibits a permeance with respect to the permeating gas or gases of 1000 GPU or higher. Preferably, at this permeance, the membrane assembly exhibits a separation factor of 10 or higher, preferably 25 or higher, more preferably 50 or higher, even more preferably 100 or higher and most preferably 200 or higher.

In an embodiment, the membrane assembly of the invention, during operation, exhibits a permeance with respect to the permeating gas or gases of $10^4$ GPU or higher. Preferably, at this permeance, the membrane assembly has a separation factor of 5 or higher, preferably 10 or higher, more preferably 15 or higher, even more preferably 30 or higher, and most preferably 40 or higher.

In an embodiment, the membrane assembly of the invention, during operation, exhibits a permeance with respect to the permeating gas or gases of $10^5$ GPU or higher. Preferably, at this permeance, the membrane assembly has a separation factor of 4.7 (Knudsen selectivity) or higher, preferably 5 or higher, more preferably 7 or higher, even more preferably 10 or higher, and most preferably 15 or higher.

In an embodiment, the membrane assembly of the invention, during operation, exhibits a permeance with respect to the permeating gas or gases of $2\times10^5$ GPU or higher. Preferably, at this permeance, the membrane assembly has a separation factor of 4.7 or higher, preferably 5 or higher, more preferably 7 or higher, even more preferably 10 or higher, and most preferably 15 or higher.

In an embodiment, the membrane assembly of the invention, during operation, exhibits a permeance with respect to the permeating gas or gases of $10^6$ GPU or higher. Preferably, at this permeance, the membrane assembly has a separation factor of 4 or higher, preferably 4.5 or higher, more preferably 5 or higher, even more preferably 7 or higher, and most preferably 10 or higher.

In an embodiment, the membrane assembly of the invention, during operation, exhibits a permeance with respect to the permeating gas or gases of $5\times10^6$ GPU or higher. Preferably, at this permeance, the membrane assembly has a separation factor of 4 or higher, more preferably 4.7 or higher, even more preferably 5 or higher, and most preferably 6 or higher.

The membrane assembly of the invention may exhibit during operation, a permeance with respect to the permeating gas or gases of $10^8$ GPU or lower, preferably $5\times10^7$ or lower.

The parameters of permeance and separation factor are preferably determined as set out in the experimental section of the present application. Preferably, these parameters are determined at 20-25° C. (RT). For example, these parameters may be determined based on different ratio of gas mixture between 1:1 to 1:5 (retained gas or gases:permeating gas).

In an embodiment, the mechanism of gas-separation is not Knudsen diffusion, not molecular sieving, and not solution diffusion. Preferably, the separation mechanism of gas-separation in accordance with the invention is adsorptive separation.

In an embodiment, the membrane assembly is subject to saturation. Saturation is preferably characterized in that the separation efficacy is diminished and/or selectivity changes and in particular decreases upon continued use of the membrane assembly for gas separation. Without wishing to be bound by theory, it is supposed that, at saturation, the adsorption capacity of the gas-affinity material is reached and no more gas can be adsorbed.

The membrane assembly is preferably suitable for regeneration. Regeneration may be conducted, for example, by thermal treatment. For this reason, the regeneration is a thermal regeneration. In a preferred embodiment, the membrane assembly is exposed to a temperature of 150° C.-300° C., preferably about 200° C.-280° C., most preferably 230-270° C., for example 250° C. Preferably, regeneration is done under vacuum while the membrane assembly is exposed to the indicated temperature.

The exposure time during regeneration at the indicated temperatures is preferably selected such that 80-100% of adsorbed gas is desorbed, preferably 90-100%, and most preferably 95-100%. Typical exposure times are 30 mins or more, preferably 60 mins or more, more preferably 90 mins or more, for example 2 hours or more.

In an embodiment, the thermal treatment is an exposure to 200° C. for 2 hours or more, preferably 250° C. for two hours or more. Exposure may be up to several hours, for example up to 24 hours, preferably up to 12 hours, most preferably up to 6 hours or up to 4 hours.

In an embodiment, during the regeneration of the membrane, the adsorbed gas is preferably released from the gas-affinity material and is thus preferably captured. In this manner, the gases of the mixture of gases may be efficiently separated.

It is noted that all materials of the membrane assembly are preferably selected so as to withstand the temperature used for regenerating the membrane assembly. In particular, the porous membrane, the porous substrate and the gas-affinity material preferably support the temperatures for at least two hours. During these thermal treatments, the membrane assembly and all of its components preferably remains intact and is not damaged.

It is also noted that regeneration is not mandatory. In some cases, the inventors observed that the membrane assembly can be used continuously, for example in case of (Gas/$CO_2$) separation using membranes comprising Ni areas as gas-affinity materials.

While certain of the preferred embodiments of the present invention have been described and specifically exemplified above, it is not intended that the invention be limited to such embodiments. Various modifications may be made thereto without departing from the scope and spirit of the present invention, as set forth in the following claims. Herein below, examples of the invention are disclosed. These examples are for illustration only and are not intended to limit the scope of the present invention.

EXAMPLES

Example 1: Choice of Materials, Fabrication of Porous Graphene Support on Holey Silicon Nitride ($SiN_x$) Substrate

Summary of Example 1

Figure 4:
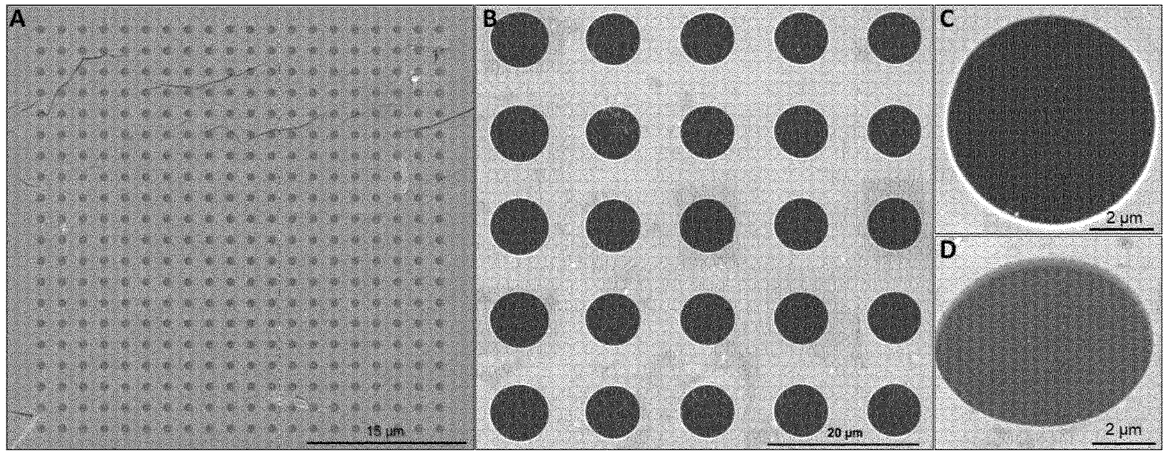
FIG. 4 shows SEM images of graphene membranes on $SiN_x$ substrate: (A) a 20×20 array of 650 nm pores on $SiN_x$ covered with double layer of graphene. (B) 5×5 array of 6 μm $SiN_x$ pores covered with single layer of graphene, (C) Magnified single 6 μm $SiN_x$ pore window covered with single layer graphene, (D) 52° tilted image of single 6 μm $SiN_x$ window demonstrating the morphology of single layer graphene. The SEM images reveal the efficiency of graphene transfer process. The sample in B was prepared using $SiN_x$ with large pore windows (6 μm) to better visualize the quality of graphene morphology.
Figure 5:
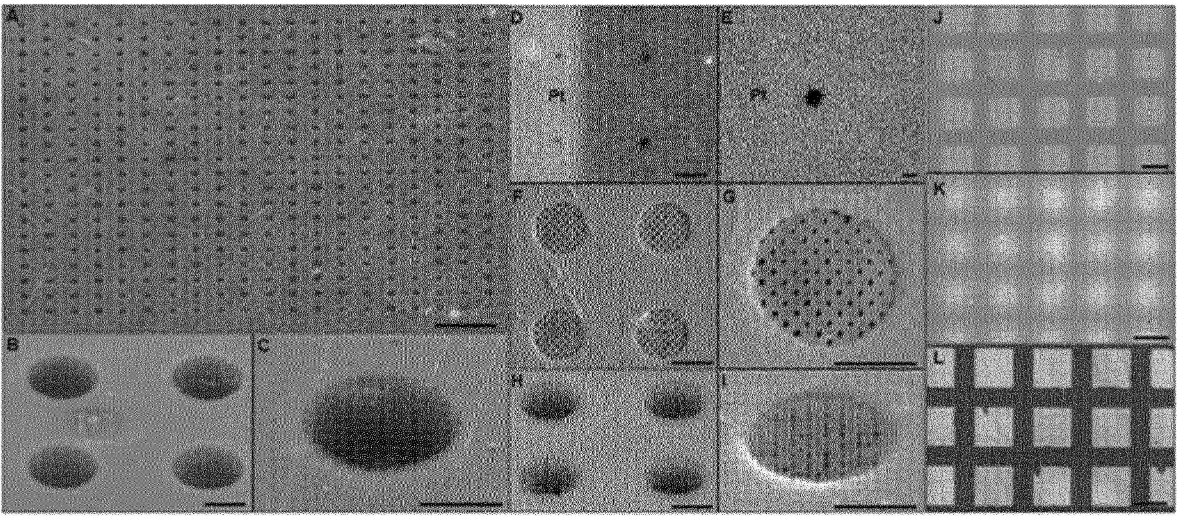
FIG. 5 shows Electron microscopy characterization of adsorptive membranes. SEM images of A) a 20×20 array 650 nm $SiN_x$ pores fully covered with double layer graphene and perforated using FIB (PG-1), B) four 650 nm $SiN_x$ pores covered with perforated graphene (PG-1), C) single $SiN_x$ pore covered with perforated graphene (PG-1). D) HR-TEM image of four FIB perforated pores, left part is coated with Pt using 100 μs dwell time and single pass (G/Pt-FIB), E) HR-TEM image of single graphene pore coated with Pt using 100 μs dwell time and single pass (G/Pt-FIB). F) four $SiN_x$ pore covered with holey graphene and coated with 50-nm Pd thin film over an array of 300-mesh Cu TEM grids (G/Pd-MI-2), G) single $SiN_x$ pore covered with holey graphene and coated with 50-nm Pd thin film over 300-mesh Cu TEM grids (G/Pd-MI-2), H) four $SiN_x$ pores with perforated graphene after being coated with 3.0-nm gold thin film (G/Au), I) single $SiN_x$ pore with perforated graphene after being coated with 3.0-nm gold thin film (G/Au). J) Pd microislands obtained by 50 nm Pd deposition over 2000-mesh Cu grids (G/Pd-MI-1), K) Pd microislands obtained over 50 nm Pd deposition over 300-mesh Cu grids (G/Pd-MI-2), L) Ni microislands obtained over 50 nm Ni deposition over 300-mesh Cu grids (G/Ni-300-50). Scale bars: A, J—5 μm, B, C, F, G, H, I—500 nm, D—50 nm, E—10 nm, K, L—50 μm.
Figure 6:
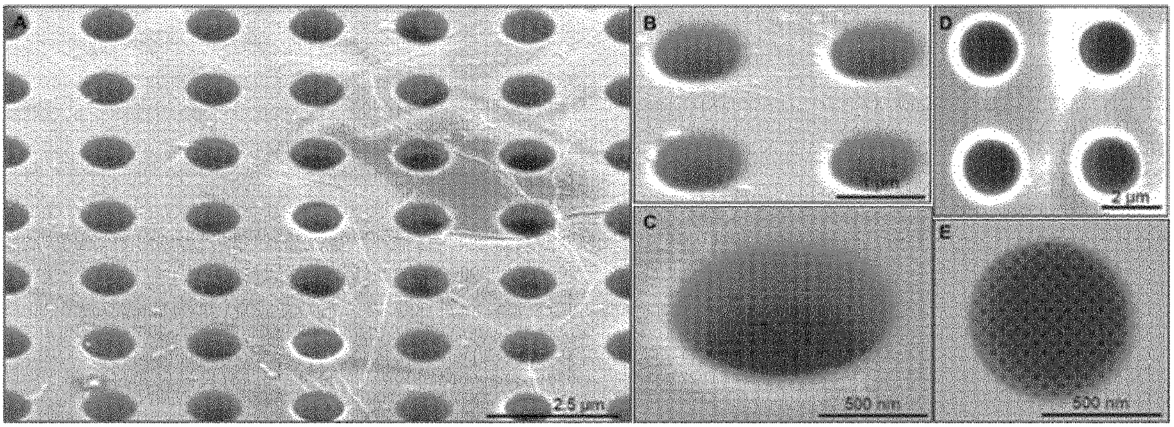
FIG. 6(A) Zoom-in SEM image of a portion of 20×20 array of holey $SiN_x$ substrate with 650 nm pores covered with FIB-perforated double layer graphene (PG-1). (B) Magnified four $SiN_x$ pores covered with perforated double layer graphene. (C) Single $SiN_x$ pore covered with perforated double layer graphene. SEM images from A-C are tilted 52° in order to better visualize the morphology of perforated graphene. (D) SEM images of 4 $SiN_x$ pores and (E) single $SiN_x$ pore covered with perforated double layer graphene (PG-2). Note: SEM images were digitally enhanced in order to better visualize the FIB fabricated pores.

The thickness of the membrane is inversely related to the permeance, achieving thickness below the mean free path of the gas molecule can provide an effusion flow, thus eliminating the interaction of the gas molecules with the membrane walls. For instance, graphene can be an excellent membrane material due to its atomic thickness and mechanical stability. It has been shown that vast permeances in the range of ~$10^6$-$10^7$ GPU (1 gas permeation unit=$3.35\times10^{-10}$ $mol\cdot m^{-2}\cdot s^{-1}\cdot Pa^{-1}$) can be achieved with a membrane based on porous double layer graphene, albeit with low gas selectivities. Accordingly, we identified porous double-layer graphene as the high permeance support layer for our adsorptive membrane (FIG. 2, panel B). Specifically, we transferred a double layer graphene onto a holey silicon nitride ($SiN_x$) substrate (with 20×20 array of ~650 nm diameter pores) using a facile, photoresist-based method (FIG. 3), which offers clean, defect-free and high-quality graphene transfer in good yields (FIG. 4). At this point, graphene is impermeable to any gas and artificial pores need to be generated. We fabricated uniform pores ranging from 10-20 nm (mean=13.0 nm) using a Focused Ion Beam (FIB) (FIGS. 5-7). As expected, gas separation on FIB patterned porous double layer graphene, that is PG-1, follows the Knudsen diffusion mechanism (not shown).

Materials and Methods Example 1

Single layer graphene grown on a copper foil was obtained from Graphenea EU and used as received. The holey silicon nitride ($SiN_x$) frames containing 26 of 20×20 array 650 nm diameter circular holes were custom fabricated by Norcada Inc, Canada. These membranes were used for gas membrane measurements. Additionally, only for electron microscopy characterization, holey $SiN_x$ chips containing 21 of 5×5 array of 6 μm diameter circular pores were prepared using lithographic technique by using a previously reported method (K. Celebi et al., Ultimate Permeation Across Atomically Thin Porous Graphene. *Science* 344, 289-292, 2014). As the $SiN_x$ is an insulator and graphene is a highly conductive material, larger pore windows of $SiN_x$ enable images without charging and provide more clear information on the pore size and structure of graphene layer in the Scanning electron microscopy (SEM) and Transmission electron microscopy (TEM) characterization.

Graphene Transfer

We developed a new technique involving a thick layer of photoresist for graphene transfer. Graphene on a copper film was coated with Shipley S1800 photoresist (Microposit) by drop casting, and allowed to dry in the oven at 70° C. overnight. After the solidification of the photoresist layer, copper layer was etched in 0.5 M ammonium persulfate (Sigma-Aldrich) solution for 30 minutes, photoresist/graphene layer was washed several times with deionized (DI) water prior to its transfer onto holey $SiN_x$ substrates. In order to remove trapped water molecules, $SiN_x$/Graphene/Photoresist was dried at room temperature for 1 h. After drying, the $SiN_x$/Graphene/Photoresist was annealed at 90° C. on a hot plate for 45-50 seconds. This annealing process allows the photoresist layer to melt down and graphene layer to stick on the $SiN_x$ substrate. The substrate with graphene was immersed into acetone to completely dissolve the photoresist layer, and then the substrate/graphene was immersed into a fresh acetone solution and kept for 30 minutes. Finally, $SiN_x$/graphene was washed with ethanol and allowed to dry overnight. The detailed schematics of new graphene transfer procedure is given in FIG. 3. The second layer of graphene was transferred by following the same procedure except the annealing step. The SEM (ThermoFischer Scios 2) images showing the quality of transferred graphene samples are provided in FIG. 4.

Pore Fabrication Using FIB and Characterization

Focused ion beam (FIB) instrument (ThermoFischer Scios 2) was used to fabricate pores on the double layer graphene. Pores were generated using $Ga^+$ ions at 30.0 kV accelerating voltage and 1.5 pA current. Using higher currents led to graphene tearing. Pores with diameters ranging from 10-20 (mean=13.0 nm) (PG-1) and 30-50 nm (mean=44.0 nm) (PG-2) were obtained using 0.5 ms (~$1.0\times10^{-7}$ $pA/nm^2$) and 9.0 ms (~$1.8\times10^{-6}$ $pA/nm^2$) of dwell time and single pass, respectively (47). SEM images of fabricated pores are shown in FIG. 6. Each $SiN_x$ pore covered with double layer graphene was patterned individually to prevent tearing. The pore size distribution of fabricated pores was calculated using ImageJ software. (FIG. 7). Pores were characterized using SEM at 5.0 kV accelerating voltage and 0.40 nA of current and also using TEM (FEI Technai Osiris) at 200.0 kV accelerating voltage.

Gas Permeation Measurement Setup

Figure 8:
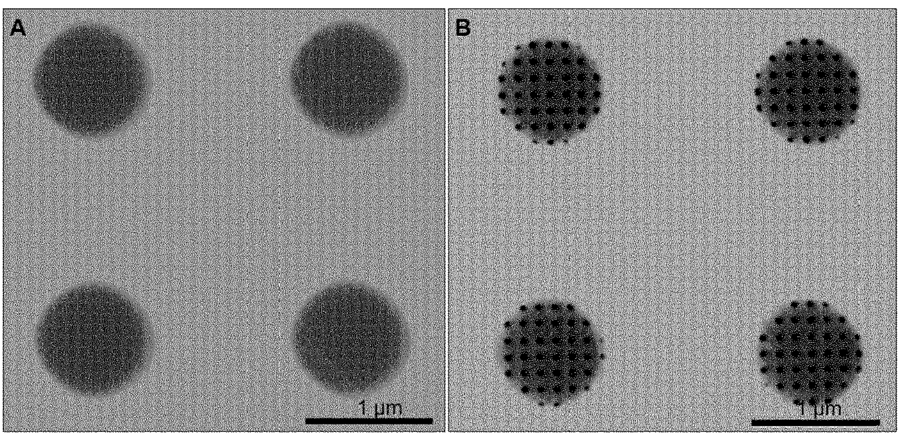
FIG. 8 schematically shows the setup for gas permeation measurement according to an embodiment: MFC-mass flow controller, DPC-differential pressure controller, MFM-mass flow meter, GC-gas chromatogram. Membrane samples was held between two O-rings in order to avoid any leaks. DPC has a 4-way connection, and adjusts the transmembrane pressure by controlling pressure difference between feed and permeate sides. MFC units control the composition of the feed gas mixture.
Figure 8:
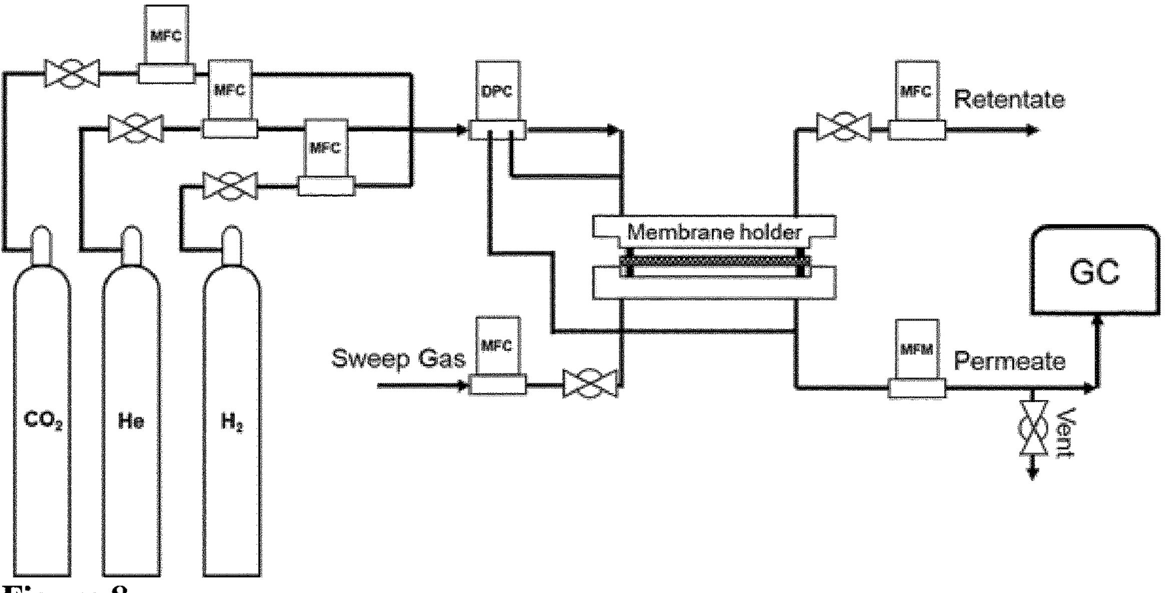

Gas permeation measurements on graphene membranes were carried out using a custom-made membrane system (FIG. 8). The system consists of 3 mass flow controllers (Alicat Scientific) controlling the feed gas, electronic differential pressure controller (DPC) (Alicat Scientific), mass flow meters (Alicat Scientific) and finally a gas chromatograph (GC) (Perkin Elmer Clarus 590 GC). The membrane was contained in a specially designed holder made out of transparent Plexiglas. Membranes in 15×15 mm size were held between two O-rings to prevent any leakage during the measurements. Before each measurement, the system was flushed with a measured gas for several minutes. The permeance of gases was calculated by plotting transmembrane pressure (bar) versus flux ($sccm/m^2$) (e.g. FIG. 10). During the mixed gas measurements, the composition of permeate was determined using GC analysis. Membranes were tested for any leak before the measurement.

Mixed Gas Separation Measurements

Gas separation measurements were performed using a custom-made membrane system; initial composition of the feed gas was controlled by mass flow controllers and 500 mbar of transmembrane pressure was applied for all the mixed gas measurements. The system was flushed with a desired ratio of the feed gas before each measurement. The gas ratio in the permeate was calculated from the corresponding gas chromatograms using the Eq. 1. Different ratios of feed gas were tested to find consistency of separation factor of membrane. Argon (Ar) was used as a carrier gas during the measurements as it was also set as a carrier gas in the GC. For $He/H_2$ separation measurements, 5:1 ($He:H_2$) initial ratio of feed gas mixture was used to precisely determine the precise saturation time. Also, for $H_2/CO_2$ separation, initial ratio of 5:1 ($H_2:CO_2$) feed gas mixture was used to determine the precise saturation time.

$$\propto = \frac{x_p/x_f}{y_p/y_f} \quad \text{Eq. 1}$$

Here, $x_p$,$y_p$ and $x_f$,$y_f$ are the molar ratios of components X and Y in the permeate and the feed, respectively.

Mechanical Stability of Graphene Membranes

The stability of fabricated graphene membranes was tested up to 1750 mbar of transmembrane pressure and found to be stable. Considering the high mechanical stability of graphene layer, the membrane failure at higher transmembrane pressures occurs due to the cracking/breaking of $SiN_x$ support. Accordingly, using thicker low stress $SiN_x$ support is expected to form mechanically more stable membranes.

Permeance Calculation

Gas flow meters were calibrated to provide the flow rates in standard cubic centimeters per minute (sccm) unit. Electronic differential pressure controller was set to millibar (mbar) unit. Then, flow rate was converted into flux (sccm/$m^2$) by dividing the flow rate to the membrane area. Flux was converted into molls using the following equation:

$$\frac{\text{mol}}{\text{s}} - \frac{1\ \text{scm}^3}{\text{min}} * \frac{1\ \text{min}}{60\ \text{s}} * \frac{1\ sl}{1000\ \text{scm}^3} * \frac{1\ \text{mol}}{22.41\ sl} \quad \text{Eq. 2}$$

Flux calculated in $mol \cdot s^{-1} \cdot m^{-2}$ unit was plotted against pressure (Pa) and the slope of the curve was taken as permeance in SI units ($mol \cdot s^{-1} \cdot m^{-2} \cdot Pa^{-1}$). Later, the calculated unit was converted into Gas Permeation Unit (1 GPU=$3.35\times10^{-10}$ $mol \cdot s^{-1} \cdot m^{-2} \cdot Pa^{-1}$).

Example 2: Deposition of Pt Layer on Porous Graphene, Reduction of Pore Size

Summary and Results of Example 2

As the adsorptive layers, we investigated nano/microislands of Pd, Pt, and Ni on the porous double layer graphene support to target a single gas in binary gas mixtures.

In order to demonstrate the effectiveness of the adsorptive separation mechanism using a catalytic membrane, we targeted $He/H_2$ separation, which is extremely challenging to achieve using conventional membranes as the mass and the size differences between these two gases are very small.

Porous double layer graphene (PG-1) is selective towards hydrogen as it is the lightest gas (ideal $He/H_2$ selectivity, $\alpha_{He/H2}$=0.89) (not shown). We have investigated both Pt (Examples 2 and 3) and Pd (Example 4) as the adsorptive layer for $H_2$ gas and varied the deposition techniques and the nanostructure of the metal layer to achieve ideal separation performance.

Figure 9:
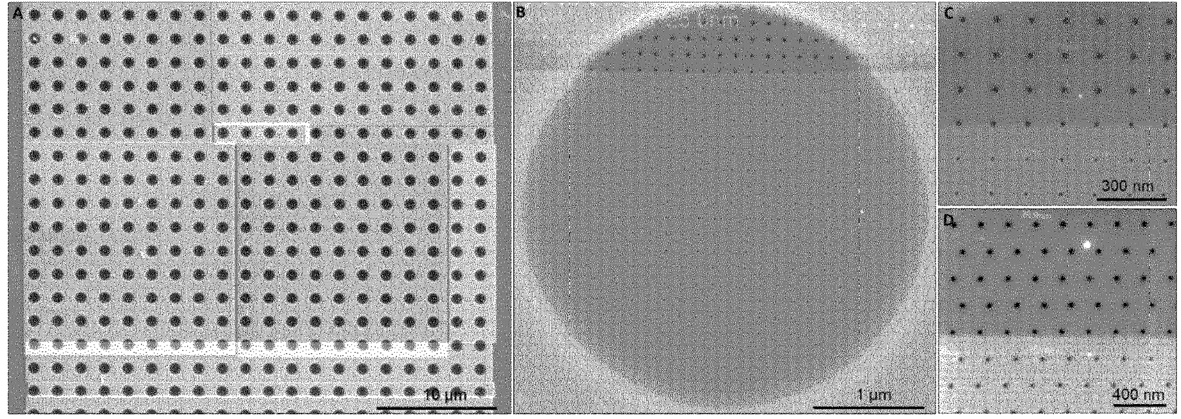
FIG. 9(A) SEM image of 20×20 array of 650 nm $SiN_x$ pores covered with perforated graphene and coated with Pt deposited using 100 μs dwell time and single pass in FIB (G/Pt-FIB), (B) Magnified SEM image of a single 6 μm pore covered with perforated graphene and partially coated with Pt using 150 μs dwell time and single pass at 5.00 kV accelerating voltage and 0.80 nA current, (C-D) SEM images of zoomed in regions in B. The Pt deposition reduces the pore size, and this sample was prepared in order to better understand how much pore reduction happens during Pt deposition. The average pore size in B-D has reduced from ~25 nm to 15 nm.

Firstly, we deposited ~5.0 nm of Pt thin layer onto PG-1 using FIB (G/Pt-FIB) (sample name: G/M-XXX where G is graphene, M is the metal layer and XXX is parameters used to produce catalytic layer) (FIG. 9). Following Pt coating on the PG-1, the average pore diameter was reduced from ~13 nm to ~10 nm, which was verified from HR-TEM images shown in FIG. 5 panels D and E. Whereas the permeance changed slightly, from $1.2\times10^8$ to $8.7\times10^7$ GPU due to the decrease in the pore size (FIG. 10), the $He/H_2$ separation factor increased from 0.89 to 1.86. Notably, Pt layer deposition has altered the membrane separation mechanism from Knudsen diffusion to adsorptive separation by reversing the selectivity towards He. The separation mechanism reversed back to Knudsen diffusion with $H_2$ being favored (FIG. 10) when the adsorption capacity was reached. Accordingly, the performance of adsorptive membranes was evaluated based on the separation factor, permeance and saturation time. The $He/H_2$ separation factor of the G/Pt-FIB sample starts to decrease as the surface becomes saturated while the permeance stays constant. Eventually, the $He/H_2$ separation factor reaches to 1 after 21 minutes and the membrane starts to favor $H_2$ under the constant flow of $He:H_2$ (5:1 feed ratio) mixture.

Materials and Methods Example 2

Pt Deposition Using FIB

Following the pore fabrication using FIB, a thin layer of Pt was coated onto the $SiN_x$/graphene using electron beam induced deposition. Two different parameters were used to form a continuous layer (Example 2) and a nanoisland structure (Example 3). In order to form a thin film, 5.0 kV of accelerating voltage and 0.80 nA of current was used, the pitch size was kept 6.5×6.5 nm to facilitate the formation of a continuous film (FIG. 9). Deposition was made using 100 μs of dwell time and single pass. To produce Pt nanoislands, 20.0 kV of accelerating voltage, 3.2 nA current and pitch size of 65×65 nm was used. In order to increase the size of the nanoislands, 9.5 ms of dwell time and single pass was used. The surface roughness, deposition structure and surface morphology of Pt layer was analyzed using Atomic Force Microscopy (Asylum Research MFP-3D Oxford Instruments) (FIG. 11). The analysis was carried out at tapping mode with a magnetic tip with nominal k=40 N/m (Budget sensors, f=300 kHz) at 0.50 Hz scan rate. A calibration curve was constructed using different dwell times and number of passes (FIG. 11). The height of the Pt deposited using FIB was calculated using the calibration curve. All the images and measurements were obtained at room temperature.

Example 3: Porous Graphene Membrane with Pt-Nanoislands, Deposited Using FIB

Figure 12:
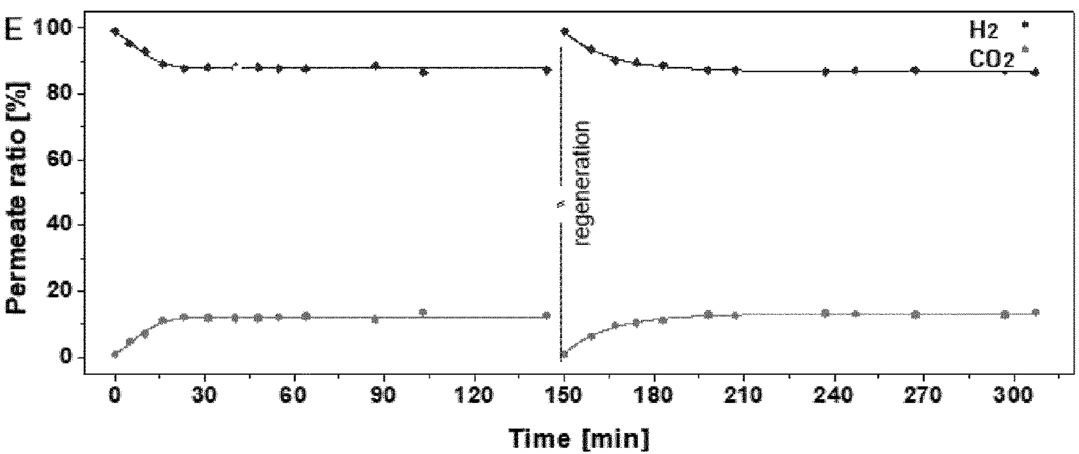
FIG. 12 Gas separation performance of adsorptive membranes. A) Permeate composition (%) vs time curve for $He/H_2$ gas separation using G/Pt-NI membrane prepared by Pt nanoisland deposited using FIB, B) $He/H_2$ separation factor change over time for the G/Pt-NI membrane. After the saturation of the membrane (t=21 min), it starts to follow the Knudsen mechanism ($\alpha_{He/H2}$=0.71), C) Permeate composition (%) vs time curve for $He/H_2$ gas separation using G/Pd-MI-1 membrane prepared by Pd deposition over 2000-mesh TEM grids, D) Permeate composition (%) vs time curve for $He/H_2$ gas separation using G/Pd-MI-2 membrane prepared by Pd deposition over 300-mesh TEM grids along with the effect of thermal regeneration at 250° C. for 2 h on the gas separation performance, E) Permeate composition (%) vs time curve for $H_2/CO_2$ gas separation using G/Ni-300-50 membrane prepared by Ni deposition over 300-mesh TEM grids along with the effect of thermal regeneration at 250° C. for 2 h on the gas separation performance. F) $H_2/CO_2$ separation factor vs time curve of G/Ni-300-50 membrane and its thermal regeneration. Inset: the select region of the plots. As shown in the plot, the separation factor does not drop down to the theoretical maximum of Knudsen selectivity (α=4.69) even after 2 hours.
Figure 14:
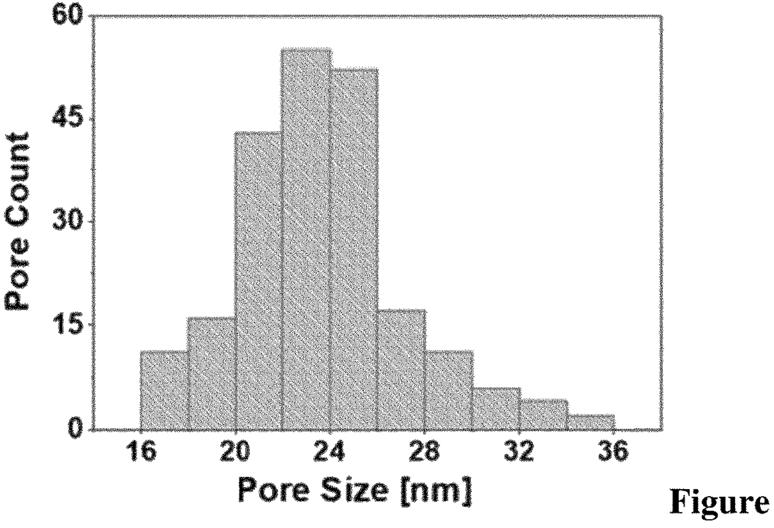
FIG. 14 shows Pore size distribution histogram of the pores in (C) mean: 12.1 nm.

Summary and results Example 3: In order to clearly understand the effect of surface morphology on the performance of the membrane, we deposited ~50-nm thick Pt nanoislands (~65×65 nm) on the PG-1 surface using FIB (sample G/Pt-NI). The Pt nanoislands showed a remarkable $He/H_2$ separation factor of 74, with the permeance of 3.0× $10^7$ GPU and a saturation time of 18 min (FIG. 12, panels A and B).

Method: Deposition of Pt nanoislands: See Pt deposition using FIB in Example 2.

Example 4: Porous Graphene Membrane with Pd-Nanoislands, Deposited by PVD Using 2000-Mesh Cu TEM Grids Summary and Results Example 4

Having established the impact of the metal layer and its nanostructure on the gas separation performance, we decided to explore Pd as the adsorptive layer owing to its higher affinity towards $H_2$. Since FIB is limited to Pt and rather time-consuming, we resort to physical vapor deposition (PVD) and also introduced Transmission Electron Microscope (TEM) Cu grid as a structural template by way of a single-step, facile method for metal microisland deposition onto the PG-1 surface. We deposited 50-nm of Pd thin film through an array of 2000-mesh TEM Cu grids to form Pd microislands (~6.5×6.5 μm). However, 50 nm thick Pd coating layer blocked the pores on the PG-1 almost completely (not shown). To overcome this problem, we perforated larger pores, 30-50 nm (mean=44.0 nm), on the double layer graphene (PG-2) (FIG. 6 panels D-E and FIG. 7 panel B). The ideal $He/H_2$ selectivity and the He permeance of PG-2 membrane was measured to be 0.57 and 2.5×$10^9$ GPU (not shown) respectively. Checkmate patterned, uniform Pd microislands (6.5×6.5 μm) were formed using 2000-mesh Cu TEM grids (FIG. 5 panel J and FIG. 15 panel A) (sample G/Pd-MI-1). The G/Pd-MI-1 sample showed an infinite $He/H_2$ separation factor and retained the permeance of 2.8×$10^7$ GPU. The saturation time of this membrane was measured to be 30 minutes, a significant increase compared to the G/Pt-NI, pointing to the impact of Pd coating layer as well as the metal nanostructure (FIG. 12 panel C).

Methods Example 4

Figure 15:
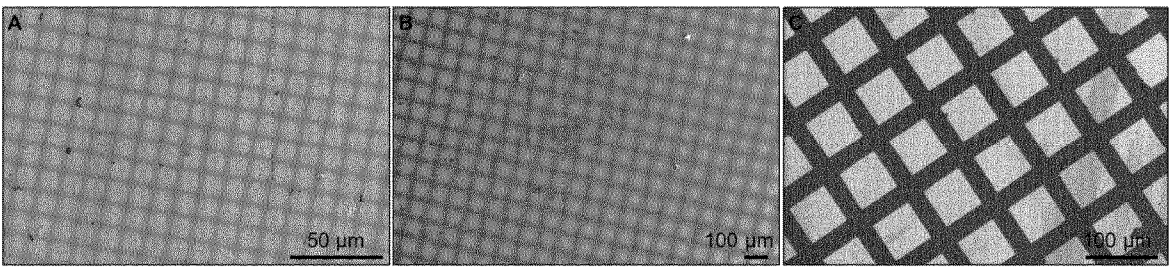
FIG. 15 SEM images of (A) 50-nm Pd microislands deposited through an array of 2000-mesh TEM Cu grids (G/Pd-MI-1), (B) 50-nm Pd microislands deposited through an array of 300-mesh Cu TEM grids (G/Pd-MI-2), (C) 50-nm Ni microislands deposited through 300-mesh Cu TEM grids (G/Ni-300-50). As shown in the images, TEM Cu grids provide a facile method for the deposition of uniform metal microislands with high adsorption surface areas.

Metal Layer Deposition Using PVD:

Pd and Ni thin films were deposited using an advanced sputtering tool (Alliance Concept DP650) at CMi Labs EPFL. Au thin film was deposited using a conventional sputtering tool (Cressington 208HR). To increase the surface of area of the adsorptive layer and avoid the formation of void spaces under the TEM Cu grids, prior to microisland deposition, thin films of selective metal layer (5.0 nm of Pd for $H_2$ (Example 4) and 5.0 nm of Ni for $CO_2$ (Example 8)) were deposited. Afterwards, an array of 2000 (G/Pd-MI-1) (Example 4) and 300 (G/Pd-MI-2) (Example 5) mesh TEM Cu grids (Agar Scientific) were taped onto it and 50 nm of metal layer was deposited (FIG. 15). Following the metal deposition, TEM grids were removed and the resulting membranes were used for the gas separation measurements. As the thin film deposition instruments are already optimized for precise thickness control, additional thickness measurements on the membranes were not implemented.

Example 5: Porous Graphene Membrane with Pd-Nanoislands, Deposited by PVD Using 300-Mesh Cu TEM Grids Summary and results Example 5: We also explored larger windowed 300-mesh TEM grids, which are cheaper and easier to handle, as structural templates for the microisland formation (FIG. 5 panel K and FIG. 15 panel B). After the deposition of 50-nm Pd microislands (~65×65 μm), G/Pd-MI-2, the pore diameter was reduced down to ~25 nm from ~44.0 nm (FIG. 5 panels F-G and FIG. 13). The G/Pd-MI-2 sample also showed an infinite $He/H_2$ separation factor and permeance value of 2.6×$10^7$ GPU along with a saturation time of 43 minutes (FIG. 12 panel D). It should be noted that it is rather challenging to obtain these performance metrics using steady-state gas separation membranes (Table 1). It is suggested that the saturation time increase compared to G/Pd-MI-1 originated from more efficient metal layer coating through larger windows of 300-mesh TEM Cu grids.

TABLE 1

Comparison table of our $He/H_2$ separation membranes with other membranes reported in the literature, clearly showing the exceptional performance of adsorptive membranes featuring affinity-based separation.

| Membrane | He Permeance ($mol \cdot m^{-2} \cdot s^{-1} \cdot Pa^{-1}$) | He Permeance (GPU) | $He/H_2$ selectivity | Reference |
|---|---|---|---|---|
| Viton ® E60 fluoroelastomer | $1.61 \times 10^{-11}$ | 0.048 | 2.87 | (49) |
| Nafion ® 117 | $7.41 \times 10^{-11}$ | 0.221 | 4.39 | (50) |
| Viton ® GF fluoroelastomer | $2.36 \times 10^{-11}$ | 0.070 | 2.01 | (49) |
| Cytop ™M | $5.70 \times 10^{-9}$ | 17.0 | 2.8 | (51) |
| Fluorinated polynorbornene (FPNB) | $1.24 \times 10^{-9}$ | 3.7 | 1.52 | (52) |
| Hyflon ® AD60X (solution cast) | $1.01 \times 10^{-9}$ | 3.02 | 2.34 | (53) |
| Hyflon ® AD60 | $1.07 \times 10^{-9}$ | 3.20 | 2.1 | (51) |
| Hyflon ® AD60X (melt pressed) | $1.11 \times 10^{-9}$ | 3.32 | 2.89 | (53) |
| Hyflon ® AD80 | $1.20 \times 10^{-9}$ | 3.58 | 2 | (51) |
| Hyflon ® AD60X (solution cast) | $2.23 \times 10^{-9}$ | 6.66 | 2.45 | (54) |
| Hyflon ® AD60X (solution cast) | $2.45 \times 10^{-9}$ | 7.30 | 2.55 | (54) |
| Teflon ® AF-2400 | $8.04 \times 10^{-8}$ | 240 | 1.06 | (55) |
| Poly(vinyl alcohol) (PVA) | $2.38 \times 10^{-12}$ | $7.10 \times 10^{-3}$ | 10.9 | (56) |
| Poly(vinyl alcohol) (PVA) | $1.74 \times 10^{-11}$ | 0.052 | 7.27 | (4) |
| Isotactic Poly(Methyl Methacrylate) (PMMA) | $1.26 \times 10^{-11}$ | 0.0375 | 2.91 | (57) |

TABLE 1-continued

Comparison table of our He/$H_2$ separation membranes with other membranes reported in the literature, clearly showing the exceptional performance of adsorptive membranes featuring affinity-based separation.

| Membrane | He Permeance ($mol \cdot m^{-2} \cdot s^{-1} \cdot Pa^{-1}$) | He Permeance (GPU) | He/$H_2$ selectivity | Reference |
|---|---|---|---|---|
| Polyimide (PI) | $1.33 \times 10^{-8}$ | 39.6 | 1.17 | (4) |
| Silicon carbide (SiC) | $8.90 \times 10^{-9}$ | 26.57 | 2 | (42) |
| NPC/Graphene | $1.0 \times 10^{-8}$ | 29.85 | 2.0 | (29) |
| PG-1 | 0.040 | $1.19 \times 10^{8}$ | 0.89 | This work |
| PG-2 | 0.85 | $2.54 \times 10^{9}$ | 0.57 | This work |
| G/Pt-FIB | 0.029 | $8.66 \times 10^{7}$ | 1.86 | This work |
| G/Pt-NI | 0.0099 | $2.95 \times 10^{7}$ | 74.0 | This work |
| G/Pd-MI-1 | 0.0092 | $2.75 \times 10^{7}$ | ∞ (until saturation point) | This work |
| G/Pd-MI-2 | 0.0087 | $2.60 \times 10^{7}$ | ∞ (until saturation point) | This work |
| G/Au | 0.024 | $7.16 \times 10^{7}$ | 0.42 | This work |

Example 6: Regeneration of Membranes

Summary and Results of Example 6

In order to demonstrate the recyclability of G/Pd-MI-2, we performed thermal regeneration at 250° C. for 2 h under vacuum. Notably, the same performance metrics with a negligible loss in the saturation time were obtained for the regenerated membrane, proving the robustness of G/Pd-MI-2 (FIG. 12 panel D). Nevertheless, we also note the limitation of G/Pd-MI, that is the need for thermal regeneration following membrane saturation. Specifically, these adsorptive membranes can be effective in gas mixtures, where hydrogen content is low but fast permeation speed is required, such as nuclear fission reactors and rocket launches. Compared to currently used cryogenic distillation and pressure swing adsorption methods, adsorptive membrane gas separation offers a promising alternative by enabling He separation in a single step at room temperature.

Method of Example 6: Membrane regeneration: Adsorptive membranes were regenerated after measurement in a homemade chemical vapor deposition (CVD) furnace. Pd and Pt membranes were annealed under vacuum at 250° C. for 2 h. Ni-coated membranes were initially activated at 250° C. under 250 sccm steady $H_2$ flow for 2 h prior to gas separation measurement. Afterwards, the regeneration of the membrane was done thermally at 250° C. for 2 h under vacuum.

Figure 20:
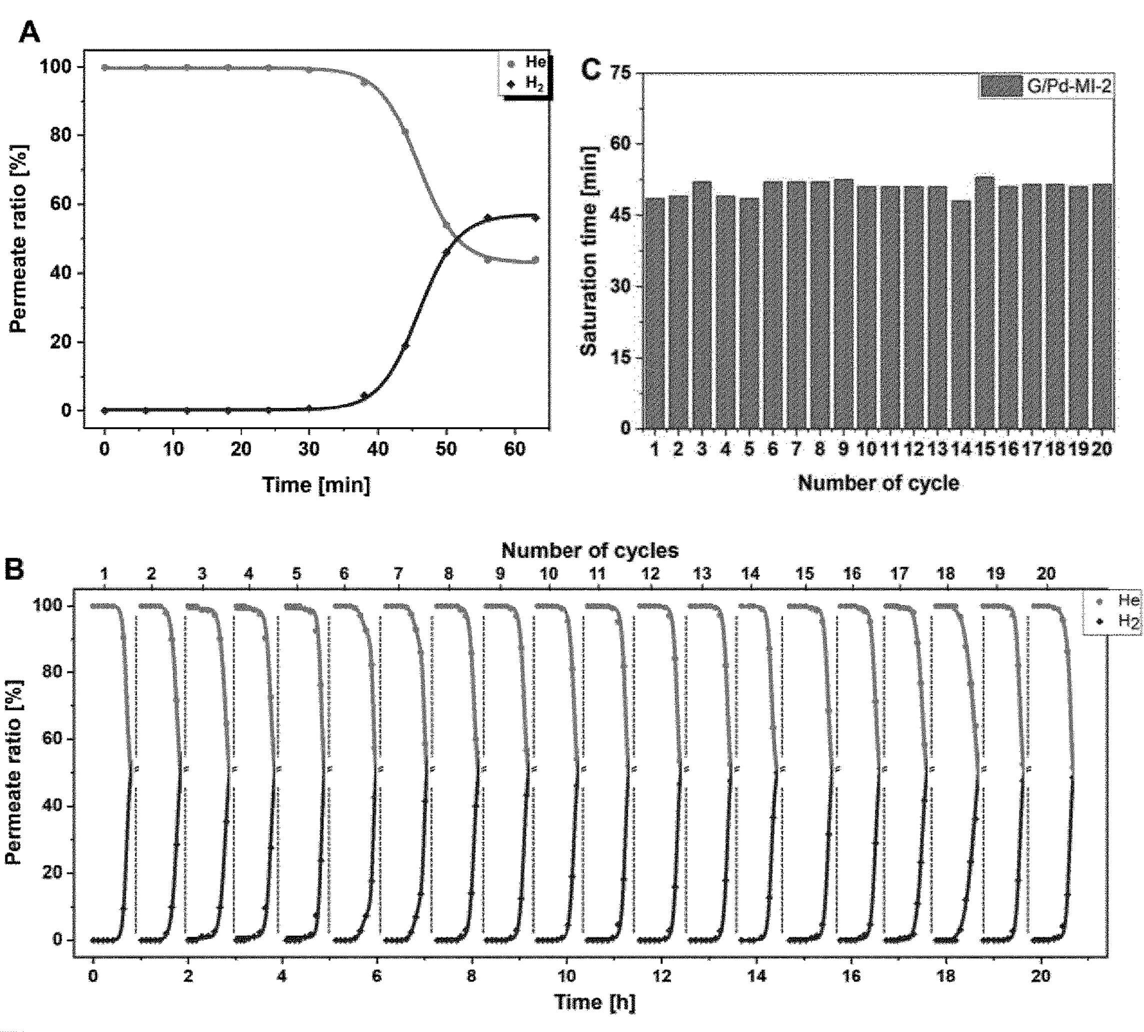
FIG. 20 shows, in panel (A), single cycle permeate composition (%) versus time curve for $He/H_2$ gas separation using G/Pd-microisland (G/Pd-MI-2) membrane prepared by Pd deposition over 300-mesh TEM grids. After the saturation of the membrane (t=~50 min), it starts to follow the Knudsen mechanism ($\alpha_{He/H2}$=0.71). Panel (B) shows permeate composition (%) versus time curve for $He/H_2$ gas separation using G/Pd-MI-2 membrane over 20 cycles. Panel (C) shows the saturation time versus number of cycles graph of G/Pd-MI-2 membrane. As it can be seen from the graph, the saturation time stays somewhat constant over 20 cycles of regeneration.
Figure 12:
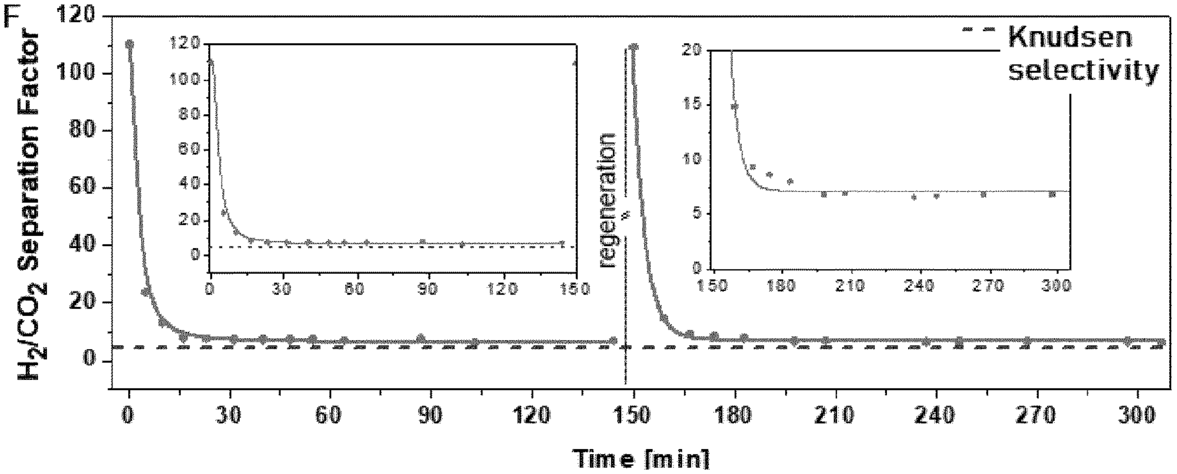

Stability of the G/Pd-MI-2 membrane after 20 cycles of recycling: Cycles of gas separation until saturation of the membrane (t=~50 min, on-set of Knudsen mechanism, $\alpha_{He/H2}$=0.71, compare with FIG. 12D) (Mixed gas separation, Example 1) and recycling as described above were repeated 20 times. The results are shown in FIG. 20, demonstrating that the saturation times stay substantially constant over 20 cycles of regeneration.

Example 7: Control Experiment with Gold Film

As a control experiment, we deposited 3.0 nm gold thin film using PVD (FIG. 5 panels D-E) as an inactive layer on the PG-1 (G/Au). As the gold layer is passive and expected not to adsorb $H_2$, it should naturally favor $H_2$ permeation and follow the Knudsen diffusion mechanism. Hence, the ideal He/$H_2$ selectivity of G/Au sample dropped to 0.42 compared to PG-1 membrane, 0.89 (not shown). We also tested different ratios of the feed gas and the separation factor was found to be independent of the feed gas composition (not shown).

Example 8: Broad Applicability, $H_2/CO_2$ Separation

Figure 16:
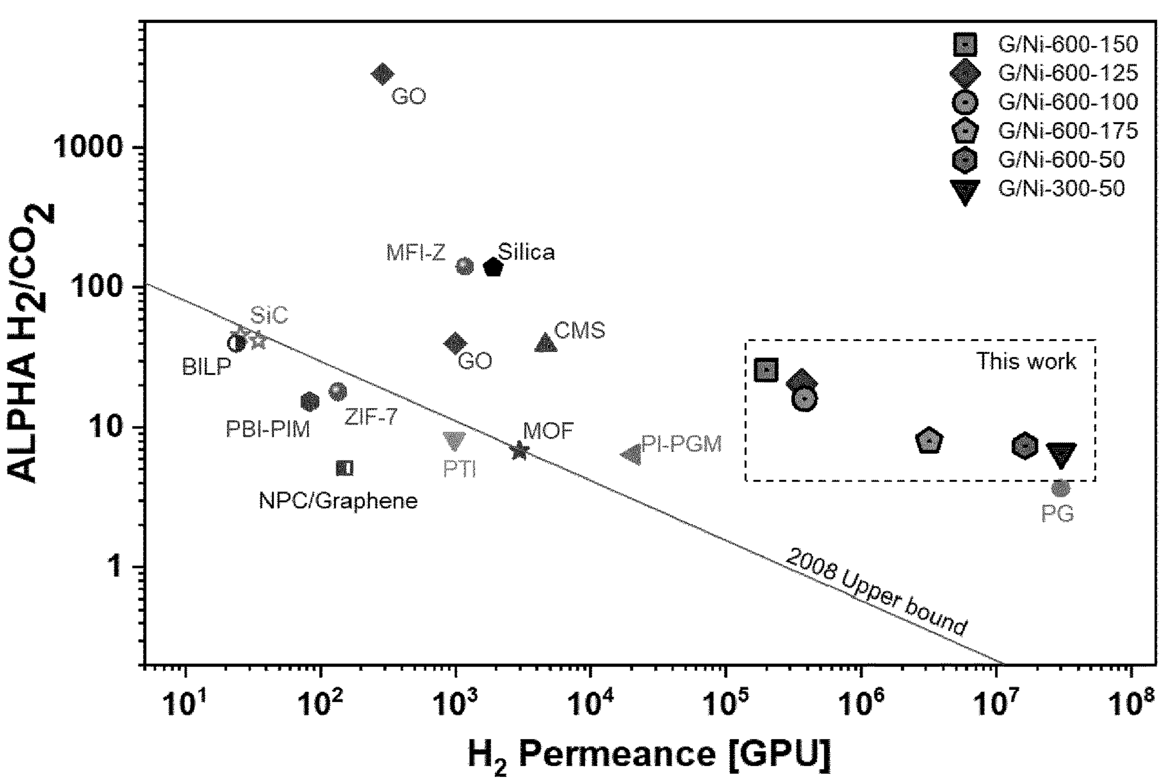
FIG. 16 shows Robeson's upper bound plots for $H_2/CO_2$ separation. Comparison of $H_2/CO_2$ separation performance of G/Ni-membrane with: graphene oxide (GO), silica, silicon carbide (SiC), carbon molecular sieve (CMS), zeolitic imidazolate framework (ZIF-7), Mordenite framework inverted-zeolite (MFI-Z), polybenzimidazole-20% polymer of intrinsic microporosity (PBI-PIM), metal-organic framework (MOF), benzimidazole-linked polymers (BILPs), poly (triazine imide) (PTI), polyimide-porous graphene membrane (PI-PGM), nanoporous carbon (NPC)/graphene film porous double layer graphene (PG) (Table 2) (1 GPU=3.35×$10^{-10}$ mol·m$^{-2}$·s$^{-1}$·Pa$^{-1}$).

In order to demonstrate the broad applicability of our approach, we also applied the adsorptive separation concept for $H_2/CO_2$ separation. Accordingly, we first deposited a $CO_2$-philic 50-nm Ni thin film using PVD onto PG-2 to enhance $H_2/CO_2$ selectivity while retaining high permeance. We first used 300-mesh TEM Cu grids to create a checkmate Ni microisland (~65×65 μm) structure (sample G/Ni-300-50, FIG. 5 panel L and FIG. 15 panel C). Ni was a material of choice as a $CO_2$-philic layer due to its stability towards oxidation and high affinity towards $CO_2$. The G/Ni-MI showed a marked improvement in $H_2/CO_2$ selectivity. For example, the highest $H_2/CO_2$ separation factor for FIB perforated double layer membrane with 7.6 nm of pores was 3.67. The initial $H_2/CO_2$ separation factor of G/Ni-300-50 membrane was measured to be 109 along with a permeance of $3.0\times10^7$ GPU. Despite the membrane saturation after 20 minutes, the separation factor decreased to 6.7 and surprisingly did not drop down to the theoretical maximum according to the Graham's Law=4.67 (FIG. 12 panel F). The separation factor remains the same even after 2 h of constant $H_2:CO_2$ flow (5:1 feed ratio), which is being the highest separation factor reported to date (FIG. 16) for $H_2/CO_2$ separation in the permeance range of ~$3.0\times10^7$ GPU. Moreover, these results demonstrate that adsorptive metal layer can introduce a permanent improvement in gas selectivity for the gas pairs with higher mass difference without effecting the permeance. We attribute this effect to the reversible binding of $CO_2$ to the Ni-surface even after surface saturation. The G/Ni-300-50 membrane can be easily regenerated by heating it under vacuum at 250° C. for 2 h without loss of the separation performance (FIG. 12 panel E).

In a next step, the effect of the thickness of the metal microislands was assessed at the example of the $H_2/CO_2$ separation using graphene membranes with Ni microislands produced as described above, using 600 mesh TM Cu grids and depositing Ni layers of 50, 75, 100, 125 and 150 nm thickness. All membranes were tested at different feed ratios ($H_2:CO_2$=5:1, 2:1, and 1:1).

The results obtained with these membranes are shown in Table 2 below, and FIGS. 16, 17, 18 and 19. As shown in FIG. 17, the separation factor increases with increasing thickness and larger mesh size (large area covered by the microislands). FIG. 18 shows in addition that larger feed ratios (higher $H_2$ percentage) resulted in larger separation factors, and that $H_2$ permeance drops with increasing thickness and increasing separation factor. In this manner, the inventors were able to increase the separation factor up to about 26. This is the highest value at about $10^5$ GPU permeance range, to the knowledge of the inventors.

It is noted that for these results using G/Ni-membranes, regeneration was not necessary for the gas separation of a gas mixture comprising $H_2$ and $CO_2$. The membrane can operate continuously, despite saturation, basically because the separation factor is still largely about the separation factor based on Knudsen diffusion.

TABLE 2

Comparison table of our $H_2/CO_2$ membranes with other with other membranes reported in the literature.

| Sample | $H_2$ Permeance ($mol \cdot m^{-2} \cdot s^{-1} \cdot Pa^{-1}$) | $H_2$ Permeance (GPU) | $H_2/CO_2$ selectivity | Reference |
|---|---|---|---|---|
| Double layer graphene with 7.6 nm pores | $1.00 \times 10^{-2}$ | $2.98 \times 10^{7}$ | 3.67 | (17) |
| Carbon Molecular Sieve | $1.56 \times 10^{-6}$ | $4.66 \times 10^{3}$ | 39 | (38) |
| Graphene Oxide | $4.09 \times 10^{-7}$ | $1.22 \times 10^{3}$ | 40 | (24) |
| Graphene Oxide | $9.70 \times 10^{-8}$ | 289.55 | 3400 | (23) |
| KUUST-1 MOF | $9.98 \times 10^{-7}$ | $2.98 \times 10^{3}$ | 6.8 | (39) |
| Silica | $6.39 \times 10^{-7}$ | $1.91 \times 10^{3}$ | 139 | (38) |
| ZIF-7 | $4.55 \times 10^{-8}$ | 135.82 | 18 | (40) |
| MFI Zeolite | $3.95 \times 10^{-7}$ | $1.18 \times 10^{3}$ | 141 | (41) |
| Silicon carbide (SiC) | $1.18 \times 10^{-8}$ | 35.22 | 42 | (42) |
| Silicon carbide (SiC) | $8.60 \times 10^{-9}$ | 25.67 | 46 | (42) |
| Benzimidazole-linked polymers (BILPs) | $8.04 \times 10^{-9}$ | 24 | 40 | (43) |
| Poly(triazine imide) (PTI) | $3.30 \times 10^{-7}$ | 985.07 | 8.2 | (44) |
| Polyimide-PGM | $6.83 \times 10^{-6}$ | $2.04 \times 10^{4}$ | 6.41 | (45) |
| PBI-20% PIM | $2.80 \times 10^{-8}$ | 83.5 | 15.3 | (46) |
| NPC/Graphene | $5.10 \times 10^{-8}$ | 152.24 | 5.1 | (29) |
| G/Ni-300-50 (5:1 Feed ratio) | $9.90 \times 10^{-3}$ | $2.95 \times 10^{7}$ | 6.63 | This work |
| G/Ni-300-50 (2:1 Feed ratio) | | | 5.76 | |
| G/Ni-300-50 (1:1 Feed ratio) | | | 4.98 | |
| G/Ni-600-50 (5:1 Feed ratio) | $5.43 \times 10^{-3}$ | $1.62 \times 10^{7}$ | 7.37 | |
| G/Ni-600-50 (2:1 Feed ratio) | | | 6.61 | |
| G/Ni-600-50 (1:1 Feed ratio) | | | 5.27 | |
| G/Ni-600-75 (5:1 Feed ratio) | $1.06 \times 10^{-3}$ | $3.17 \times 10^{6}$ | 8.02 | |
| G/Ni-600-75 (2:1 Feed ratio) | | | 7.32 | |
| G/Ni-600-75 (1:1 Feed ratio) | | | 6.14 | |
| G/Ni-600-100 (5:1 Feed ratio) | $1.29 \times 10^{-4}$ | $3.82 \times 10^{5}$ | 16.05 | |
| G/Ni-600-100 (2:1 Feed ratio) | | | 14.64 | |
| G/Ni-600-100 (1:1 Feed ratio) | | | 12.31 | |
| G/Ni-600-125 (5:1 Feed ratio) | $1.22 \times 10^{-4}$ | $3.63 \times 10^{5}$ | 20.47 | |
| G/Ni-600-125 (2:1 Feed ratio) | | | 16.92 | |
| G/Ni-600-125 (1:1 Feed ratio) | | | 14.09 | |
| G/Ni-600-150 (5:1 Feed ratio) | $6.67 \times 10^{-5}$ | $1.99 \times 10^{5}$ | 25.86 | |
| G/Ni-600-150 (2:1 Feed ratio) | | | 21.46 | |
| G/Ni-600-150 (1:1 Feed ratio) | | | 18.96 | |

CONCLUSIONS

We demonstrated that the selectivity of porous membranes, such as graphene-based membranes, can be enhanced through adsorptive separation to achieve high selectivity and permeability upon the deposition of nano-structured metal layers. Notably, the metal-coating layer can provide a permanent improvement in gas selectivity without sacrificing from the permeance. Moreover, the adsorptive separation concept can be applied to other gas mixtures with a suitable catalytic layer to realize ultrahigh permeance gas separation with small membrane footprint and operational costs.

The invention claimed is:

1. A gas-separation membrane assembly comprising a porous membrane and a gas-affinity material deposited on the porous membrane, wherein said gas-affinity material is non-continuously deposited so as to form separated, raised areas of said gas-affinity material, wherein said separated raised areas are operatively deposited on said porous membrane to adsorb, absorb and/or dissolve a first gas to be separated from a mixture of gases comprising said first gas and at least a second gas, wherein said porous membrane is permeable to said second gas, such that said gas-separation membrane is suitable to separate said first gas from said second gas by adsorbing, absorbing and/or dissolving said first gas and thereby preventing said first gas from passing through said gas-separation assembly, and wherein said gas-affinity material does not adsorb, absorb and/or dissolve said second gas, or does adsorb, absorb and/or dissolve said second gas to a lesser extent than said first gas.

2. The membrane assembly of claim 1, further comprising a porous substrate, wherein said porous membrane is in contact with said porous substrate.

3. The membrane assembly of claim 2, which comprises first and second sides wherein at the first side, the membrane assembly comprises said gas-affinity material, and wherein at the second side, said the membrane assembly comprises said porous substrate, and wherein said porous membrane is provided between said gas-affinity material and said porous substrate, and wherein said first side is intended for exposure to said mixture of gases.

4. The membrane assembly of claim 1, which exhibits saturation when a specific amount of the gas to be separated is adsorbed, absorbed and/or dissolved by said gas-affinity material and wherein, when said saturation is reached, a permeate ratio of said membrane during operation changes in that the gas to be separated is no longer separated by said membrane and/or is less efficiently separated by said membrane.

5. The membrane assembly of claim 1, wherein said separated raised areas have a thickness of 5-300 nm.

6. The membrane assembly of claim 1, wherein said separated, raised areas of said gas-affinity material are areas of 1-90,000 $\mu m^2$.

7. The membrane assembly of claim 1, wherein said separated, raised areas form micro- or nanoislands on said porous membrane or on an optional intermediate layer.

8. The membrane assembly of claim 1, wherein said porous membrane comprises pores having an average diameter of 2 nm to 200 nm.

9. The membrane assembly of claim 1, wherein said porous membrane comprises a porous two-dimensional membrane material.

10. The membrane assembly of claim 9, wherein said porous two-dimensional membrane material is selected from the group consisting of carbon-based two-dimensional membrane materials, hybrid two-dimensional membrane materials, organic two-dimensional membrane materials and inorganic two-dimensional membrane materials.

11. The membrane assembly of claim 1, wherein said porous membrane comprises a material selected from the group consisting of: graphene, graphene oxide, metal organic frameworks (MOFs), covalent organic frameworks (COFs), MXene, layered double hydroxide, zeolite, layered silicate, transition metal dichalcogenides (TMDs), and hexagonal-Boron Nitride (h-BN).

12. The membrane assembly of claim 1, wherein said porous substrate comprises or consists essentially of a material selected from the group consisting of holey silicon nitride, silicon oxide materials, aluminium oxide materials, and polymers.

13. The membrane assembly of claim 1, wherein said gas-affinity material comprises and/or consists essentially of a material selected from the group consisting of: palladium (Pd), platinum (Pt), nickel (Ni), copper (Cu), iron (Fe), cobalt (Co), and alloys comprising one or more of the aforementioned.

14. The membrane assembly of claim 1, wherein said first gas is hydrogen ($H_2$) gas, and wherein said gas-affinity material is suitable to adsorb, absorb and/or dissolve said hydrogen gas, and wherein said membrane is permeable to said second gas.

15. The membrane assembly of claim 1, which exhibits, during operation, a permeance with respect to the permeating gas or gases of $10^5$ GPU or higher and a separation factor of 5 (Knudsen Selectivity) or higher.

16. A method for separating one or more gases from a mixture of gases, the method comprising:

exposing the mixture of gases to a first side of a gas-separation membrane assembly comprising a porous membrane and a gas-affinity material deposited on the porous membrane, wherein said gas-affinity material is non-continuously deposited, wherein said gas-affinity material is suitable to adsorb, absorb and/or dissolve a first gas to be separated from said mixture of gases, collecting one or more gases that are separated from the mixture of gases on a second side of the membrane assembly, wherein said mixture of gases comprises said first gas and a second gas, wherein said gas-affinity material adsorbs, absorbs and/or dissolves said first gas, wherein said porous membrane is permeable to said second gas, wherein said second gas is collected on said second side of the membrane assembly, and wherein said gas-separation membrane is suitable to separate said first gas from said second gas by adsorbing, absorbing and/or dissolving said first gas and thereby preventing said first gas from passing through said gas-separation assembly.

17. The method of claim 16 further comprising:

restoring at least partially an initial separation capacity of said gas-separation membrane assembly by exposing the gas-separation membrane assembly to a temperature above 100° C.

18. A method for producing the gas-separation membrane assembly of claim 1, the method comprising:

providing a precursor assembly comprising a nonporous membrane on a porous substrate;

if necessary; providing pores in said nonporous membrane, thereby obtaining the porous membrane; and, depositing the gas-affinity material on said porous membrane, wherein said gas-affinity material is non-continuously deposited.

19. The method of claim 18, wherein depositing said gas-affinity material on said porous membrane comprises:

providing a grid on said porous membrane; and, depositing said gas-affinity material on the grid placed on the porous membrane, thereby obtaining separated areas of said gas-affinity material on said porous membrane.

20. The method of claim 17, wherein exposing said gas-separation membrane assembly to said temperature is done under vacuum.

21. The membrane assembly of claim 1, wherein said first gas is carbon dioxide ($CO_2$) gas, and wherein said gas-affinity material is suitable to adsorb, absorb and/or dissolve said $CO_2$ gas and wherein said membrane is permeable to said second gas.

22. The membrane assembly of claim 1, wherein gas-affinity material is deposited using focused ion beams or deposition through a grid or mesh on said porous membrane material so as to form said separated, raised areas of said gas-affinity material.

* * * * *